United States Patent
Yontz et al.

(10) Patent No.: US 10,370,518 B2
(45) Date of Patent: Aug. 6, 2019

(54) PLASTICIZER BLENDS OF KETAL COMPOUNDS

(71) Applicant: GFBiochemicals Limited, Valletta (MT)

(72) Inventors: Dorie J. Yontz, Bloomington, MN (US); Friederike Stollmaier, Rheinmuenster (DE); Kevin J. Bechtold, St. Paul, MN (US)

(73) Assignee: GFBiochemicals IP Assets B.V., Geleen (NL)

( * ) Notice: Subject to any disclaimer, the term of this patent is extended or adjusted under 35 U.S.C. 154(b) by 37 days.

(21) Appl. No.: 15/389,745

(22) Filed: Dec. 23, 2016

(65) Prior Publication Data
US 2017/0101520 A1    Apr. 13, 2017

Related U.S. Application Data

(63) Continuation of application No. 14/609,527, filed on Jan. 30, 2015, now Pat. No. 9,550,884.

(60) Provisional application No. 61/933,705, filed on Jan. 30, 2014.

(51) Int. Cl.
| | |
|---|---|
| *C08K 5/1575* | (2006.01) |
| *C08K 5/1565* | (2006.01) |
| *C08K 5/12* | (2006.01) |
| *C08J 3/18* | (2006.01) |
| *C08K 5/00* | (2006.01) |

(52) U.S. Cl.
CPC .............. *C08K 5/1575* (2013.01); *C08J 3/18* (2013.01); *C08K 5/12* (2013.01); *C08K 5/1565* (2013.01); *C08J 2327/06* (2013.01); *C08K 5/0016* (2013.01)

(58) Field of Classification Search
None
See application file for complete search history.

(56) References Cited

U.S. PATENT DOCUMENTS

| | | | |
|---|---|---|---|
| 6,054,524 A * | 4/2000 | Breton ................. | C09D 127/06 264/302 |
| 8,053,468 B2 | 11/2011 | Selifonov | |
| 2009/0291304 A1 | 11/2009 | Gross et al. | |
| 2013/0053564 A1 | 2/2013 | Selifonov et al. | |
| 2013/0310288 A1 | 11/2013 | Mullen et al. | |
| 2015/0210827 A1 | 7/2015 | Yontz et al. | |

FOREIGN PATENT DOCUMENTS

| | | |
|---|---|---|
| WO | 2007062118 A2 | 5/2007 |
| WO | 2009032905 A1 | 3/2009 |
| WO | 2009048874 A1 | 4/2009 |
| WO | 2009049041 A1 | 4/2009 |
| WO | 2009146202 A2 | 12/2009 |
| WO | 2011038337 A1 | 3/2011 |
| WO | 2010151558 A1 | 12/2014 |

OTHER PUBLICATIONS

International Search Report for International Application No. PCT/US2015/013771, International Application Filing Date Jan. 30, 2015; dated Jun. 2, 2015, 5 pages, 2 of 2.
Transmittal of International Search Report for International Application No. PCT/US2015/013771, International Application Filing Date Jan. 30, 2015; dated Jun. 2, 2015, 2 pages, 1 of 2.

* cited by examiner

*Primary Examiner* — Robert T Butcher
(74) *Attorney, Agent, or Firm* — Cantor Colburn LLP

(57) ABSTRACT

The present invention is directed to formulations including a polymer and a plasticizer composition. The plasticizer composition is a blend of an alkyl ketal ester plasticizer and a second plasticizer selected from a cycloaliphatic compound, an ortho phthalate compound, a terephthalate compound, a benzoate ester compound, and a bio-based compound. The plasticizer composition is at least 10% by weight of the total of the polymer and the plasticizer composition.

16 Claims, 3 Drawing Sheets

PLASTICIZER BLENDS OF KETAL COMPOUNDS

CROSS REFERENCE TO RELATED APPLICATIONS

This application is a Continuation of U.S. application Ser. No. 14/609,527, filed Jan. 30, 2015, which claims the benefit of U.S. Provisional Application No. 61/933,705, filed Jan. 30, 2014, all of which are incorporated by reference in their entirety herein.

FIELD OF INVENTION

The present invention is directed to blends of ketal compounds with other compounds to be used as plasticizers for organic polymers.

BACKGROUND

Plasticizers derived from 1,2-propanediol ketals of oxocarboxylate esters are described in WO2010/151558 which is hereby incorporated by reference in its entirety for all purposes.

A number of known plasticizer compounds are derived from non-renewable, petroleum or natural gas derived feedstocks. Phthalate esters, particularly, dioctyl terephthalate ester, di(2-ethylhexyl) phthalate ester, and diisononyl phthalate ester are industrially significant plasticizers useful for plasticizing many formulations; more common formulations include those containing poly(vinyl chloride) (PVC). Recent regulatory pressure has targeted phthalates (United States Environmental Protection Agency Report: Phthalates Action Plan—Dec. 30, 2009) for replacement due to the risks associated with their use.

SUMMARY

Plasticizer replacements are needed to plasticize formulations without the risk to humans, animals and the environment.

There is a need to provide plasticizers based on non-phthalates, or, more generally, from non-petroleum feedstocks. It is desirable that such materials be synthesized economically in large volumes.

A reduced gel temperature in formulations such as plastisols means that a formulator can more quickly convert the liquid plastisol formulation into a solid film, thus increasing line speed or conversion rate. Alternatively, they can lower the process temperature, saving energy. As the industry moves away from historical phthalates, a need for better fusion is emerging for extrusion and calendaring operations. New materials with high gel temperatures or high fusion temperatures require more heat and more energy to process, which can increase energy costs and increase wear-and tear on mixing equipment. There are plasticizers on the market today that can reduce gel temperature but they suffer from one or more of the following disadvantages: (1) petroleum based (2) health concern (3) subject to regulatory restriction (4) have high volatility, which can lead to high odor during processing, increased air emissions, increased exposure to workers processing PVC, and poor film quality due to release of volatiles.

Plasticizers derived from 1,2-propanediol ketals and 2-methyl-1,3-propanediol ketals of oxocarboxylate esters have several advantages over other commercially available plasticizers but may not always perform as well in specific areas. For example plasticizers derived from 1,2-propanediol ketals and 2-methyl-1,3-propanediol ketals of oxocarboxylate esters show a tremendous advantage in very low plasticizer extraction with organic solvent n-hexane versus the non-phthalate plasticizer DINCH (and dioctyl terephahalate) as well as an advantage in the gel/fusion temperature compared to DINCH. A blend approach could show an improved or adjustable improved profile for the combination of the two plasticizers, keeping the positive environmental profile.

Thus, it is also desirable to provide new plasticizer blends that result in compositions having superior overall properties to compositions without the compounds of the blends.

This invention is in one aspect a formulation comprising a polymer and a plasticizer composition, wherein the plasticizer composition is at least 5%, more specifically, at least 10% by weight of the total of the polymer and plasticizer composition, wherein the plasticizer composition comprises a blend of i) a first compound having a structure corresponding to Structure I

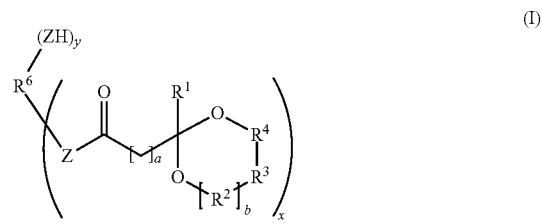

(I)

wherein a is from 0 to 12; b is 0 or 1; each R1 is independently hydrogen, a hydrocarbyl group, or a substituted hydrocarbyl group; each R2, R3, and R4 are independently methylene, alkylmethylene, or dialkylmethylene, x is at least 1, y is 0 or a positive number and x+y is at least 2; R6 is a hydrocarbyl group or a substituted hydrocarbyl group and each Z is independently —O—, —NH— or —NR— where R is a hydrocarbyl group or a substituted hydrocarbyl group; and ii) a second compound selected from a cycloaliphatic compound, an ortho phthalate compound, a terephthalate compound, a benzoate ester compound, and a bio-based plasticizer, specifically a cycloaliphatic compound, an ortho phthalate compound, a terephthalate compound, and a benzoate ester compound.

In another aspect the invention is directed to a process for plasticizing a polymer comprising mixing a polymer and a plasticizing amount of the plasticizer composition comprising a first compound of structure I and a second compound selected from a cycloaliphatic compound, an ortho phthalate compound, a terephthalate compound, and a benzoate ester compound.

In another aspect the invention is directed to an article comprising the formulation comprising a polymer and the plasticizer composition described above.

In another embodiment, the invention is directed to a plastisol formulation comprising an organic polymer and at least 30% by weight of a plasticizer composition, wherein the plasticizer composition comprises a blend of i) a first compound selected from the compound having the Structure (Ia):

(Ia)

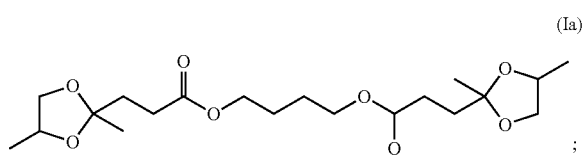

a compound having the Structure (Ib):

(Ib)

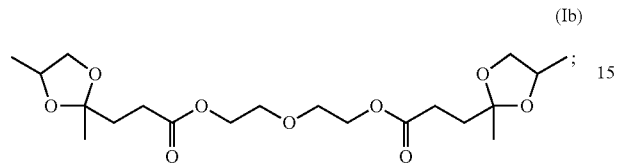

and
a compound having the Structure (Ic):

(Ic)

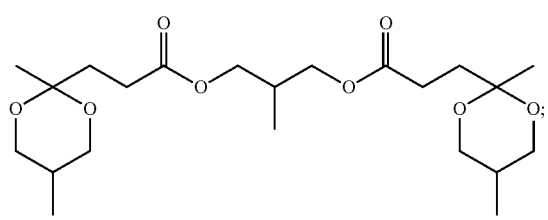

and
ii) a second compound selected from the compound having the Structure (II)

(II)

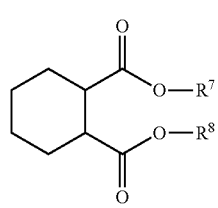

wherein $R^7$ and $R^8$ are each independently an optionally substituted linear or branched alkyl each having between 6 and 10 carbon atoms; or a compound having any of the structures (III-VI):

(III)

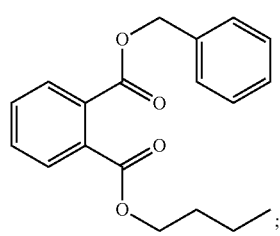

(IV)

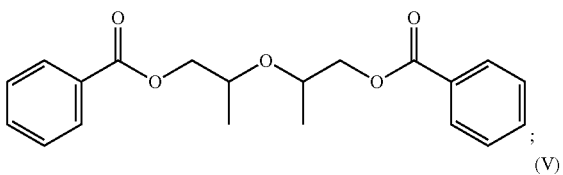

(V)

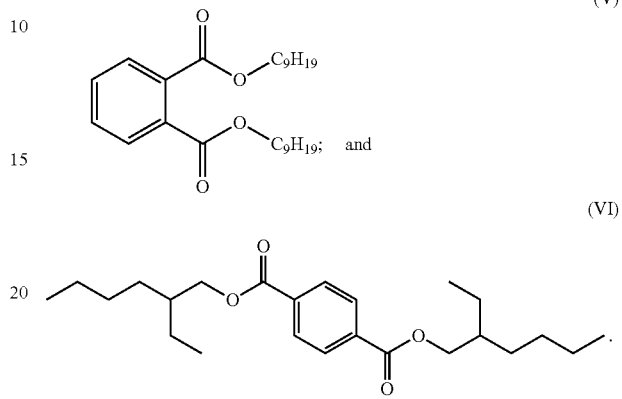

and (VI)

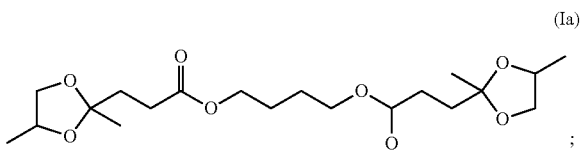

In another embodiment, the present invention is directed to a plastisol formulation comprising i) between about 30-90% by weight of a polyvinyl chloride polymer; ii) between about 5-30% by weight of a compound selected from the compounds having the having the Structure (Ia):

(Ia)

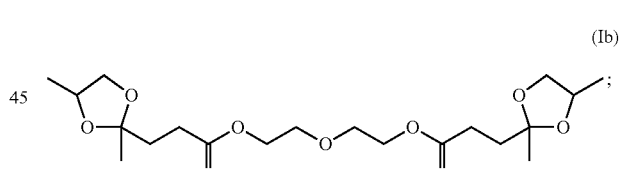

Structure (Ib):

(Ib)

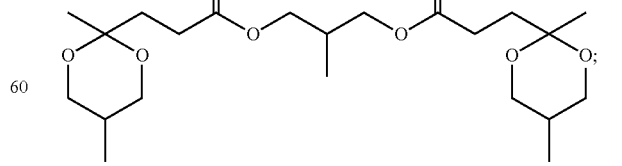

and
Structure (Ic):

(Ic)

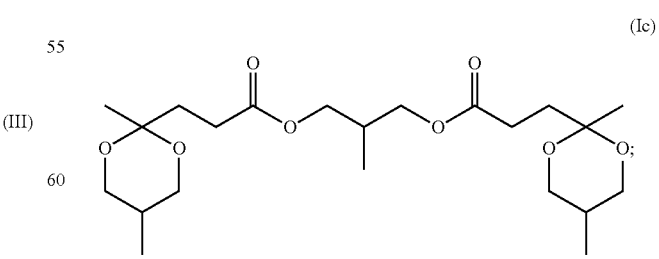

and
iii) between about 5-30% by weight a compound having the Structure (II)

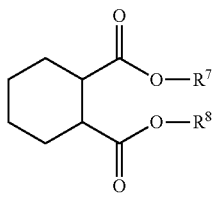

(II)

wherein $R^7$ and $R^8$ are each independently an optionally substituted linear or branched alkyl each having between 6 and 10 carbon atoms.

FIGURES

DETAILED DESCRIPTION

Figure 1:
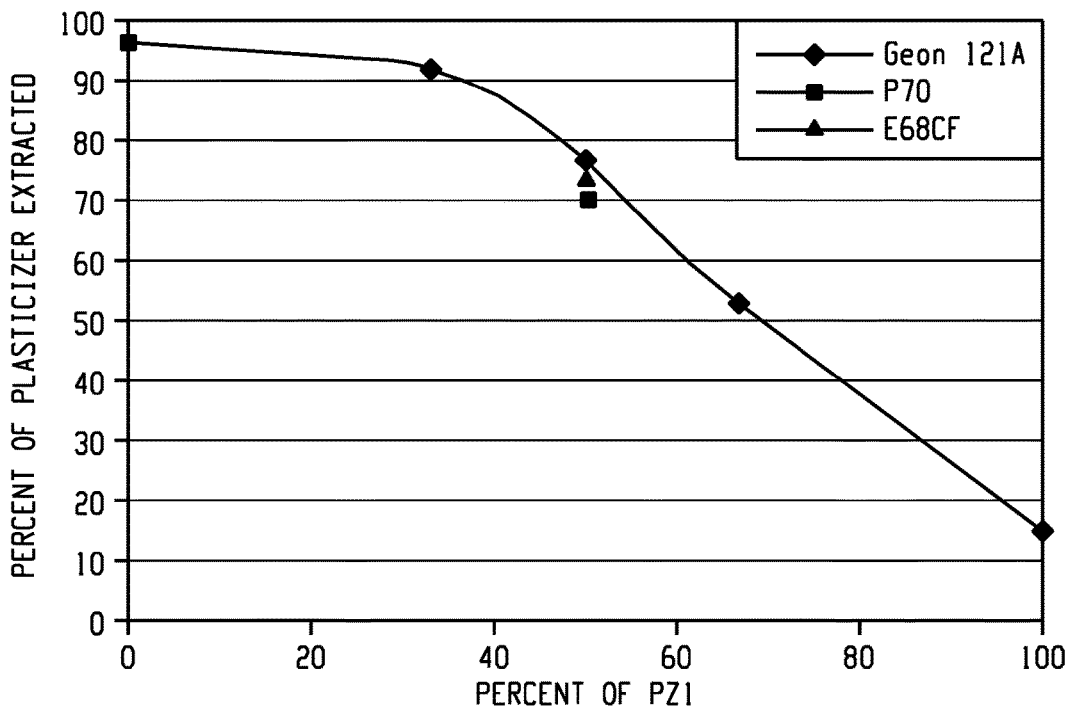
FIG. 1 shows a plot of the extraction of plasticizer with n-Hexane from blends of PZ1 with Compound (IIa) as described in Example 13.

In one embodiment, the present invention is directed to a formulation comprising a polymer and at least 1%, more specifically, at least 2%, more specifically, at least 3%, more specifically, at least 4%, more specifically, at least 5%, more specifically, at least 6%, more specifically, at least 7%, more specifically, at least 8%, more specifically, at least 9%, and more specifically, at least 10%, by weight of a plasticizer composition wherein the plasticizer composition comprises a blend of i) a first compound having a structure corresponding to Structure I

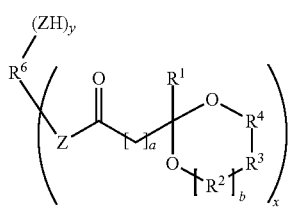

(I)

wherein a is from 0 to 12; b is 0 or 1; each $R^1$ is independently hydrogen, a hydrocarbyl group, or a substituted hydrocarbyl group; each $R^2$, $R^3$, and $R^4$ are independently methylene, alkylmethylene, or dialkylmethylene, x is at least 1, y is 0 or a positive number and x+y is at least 2; $R^6$ is a hydrocarbyl group or a substituted hydrocarbyl group and each Z is independently —O—, —NH— or —NR— where R is a hydrocarbyl group or a substituted hydrocarbyl group; and ii) a second compound selected from a cycloaliphatic compound, an ortho phthalate compound, a terephthalate compound, a benzoate ester compound and a bio-based plasticizer, such as a bio-based plasticizer derived from vegetable oils.

The structure I compounds of the plasticizer blend correspond to a reaction product of a polyol, aminoalcohol or polyamine and certain 1,2- and/or 1,3-alkanediol ketal of an oxocarboxylate esters, although the invention is not limited to any particular preparation method. 1,2- and 1,3-alkanediols ketals of oxocarboxylate esters are sometimes referred to herein as "alkylketal esters". Up to one mole of alkyl ketal ester can be reacted per equivalent of hydroxyl groups or amino groups provided by the polyol, aminoalcohol or polyamine. The polyol, aminoalcohol or polyamine is most preferably difunctional, but polyols, aminoalcohols and polyamines having more than two hydroxyl and/or amino groups can be used.

The values of x and y in structure I will depend on the number of hydroxyl groups or amino groups on the polyol, aminoalcohol or polyamine, the number of moles of the alkyl ketal ester per mole of the polyol, aminoalcohol or polyamine, and the extent to which the reaction is taken towards completion. Higher amounts of the alkyl ketal ester favor lower values for y and higher values of x.

In structure I, y is specifically from 0 to 2 and x is specifically at least 2. All a in structure I are specifically 2 to 12, more specifically, 2 to 10, more specifically, 2 to 8, more specifically, 2 to 6, more specifically, 2 to 4, and more specifically, 2. All $R^1$ are specifically an alkyl group, specifically methyl. In some embodiments of structure I, all Z are —O—, y is 0 and x is 2; these products correspond to a reaction of two moles of an alkyl ketal ester and one mole of a diol. In some other embodiments, all Z are —O—, y is 1 and x is 1; these products correspond to the reaction of one mole of the alkyl ketal ester and one mole of a diol.

In one embodiment, all b are 0. In another embodiment, all b are 1.

When Z is —O—, $R^6$ corresponds to the residue, after removal of hydroxyl groups, of a polyol having the structure $R^6(OH)_t$, where t=x+y. No two hydroxyl groups should be bonded to the same carbon atom. Suitable polyols include alkane diols such as ethane diol, 1,2-propane diol, 1,3-propane diol, 2-methyl, 1-3 propane diol, 1,4-butane diol, 1,5-pentane diol and 1,6-hexane diol, 1,4-cyclohexanediol, glycerine, trimethylolpropane, trimethylolethane, pentaerythritol, erythritol, sucrose, isosorbide, sorbitol, bisphenol-A, 2,3-dibromobutene-1,4-diol, 1,4-benzene dimethanol, 1,4-benzenediol (hydroquinone), 2-butyne-1,4-diol, 3-hexyne,3-5-diol and other alkyne-containing polyols such as those marked under the Surfynol™ brand name by Air Products and Chemicals. Other suitable polyols contain ether groups; these include glycol ethers such as diethylene glycol, triethylene glycol, dipropylene glycol, tripropylene glycol. Other suitable ether-containing polyols include hydroxyl-terminated polyethers such as poly(ethylene oxide), poly(propylene oxide), ethylene oxide-propylene oxide copolymers and polymers of tetramethylene glycol; these may have molecular weights of up to 6000, preferably up to 1000 and more preferably up to 150. The polyol may contain ester linkages; these polyols include those formed by condensation or step-growth polymerization of diols and dicarboxylic acids (or their derivatives), including a polyester of diethylene glycol and phthalic acid or phthalic anhydride. The $R^6$ group preferably contains from 2 to 24, especially from 2 to 12 or from 2 to 6 carbon atoms.

When all Z are —NR— or —NH—, $R^6$ corresponds to the residue, after removal of amino groups, of a polyamine having the structure $R^6(NRH)_t$ or $R^6(NH_2)_t$ where $t=x+y$. No two amino groups should be bonded to the same carbon atom. Examples of suitable polyamines include hydrazine, ethane-1,2-diamine, 1,6-hexanediamine, but-2-ene-1,4-diamine, Metformin, butane-1,4-diamine, propane-1,2-diamine, piperazine, 2,2,4-trimethyl-1,6-hexanediamine, 2,4,4-trimethyl-1,6-hexanediamine, benzene-1,3-diamine, 2-methylbenzene-1,3-diamine, 4-chlorobenzene-1,3-diamine, and polyoxyalkyleneamines having two amine groups, such as those sold under the trade name JEFFAMINE®, (Huntsman Corp.; Salt Lake City, Utah), diamines such as those sold under the trade name ELASTAMINE® (Huntsman Corporation), phenylene diamine, methylene bis (aniline), diethyltoluenediamine and the like.

When the Z groups in structure I include at least one —O— and at least one —NH— or —NR— linkage, $R^6$ corresponds to the residue, after removal of hydroxyl and primary or secondary amino groups, of an aminoalcohol, where the combined number of hydroxyl, primary and secondary amino groups is equal to $x+y$. Examples of suitable aminoalcohols include 2-aminoethanol, 3-aminopropan-1-ol, isopropanolamine, 2-aminopropan-1-ol, 2-aminobutan-1-ol, 2-amino-3-methylbutan-1-ol, 2-amino-4-methylpentan-1-ol, 6-aminohexan-1-ol, 1-amino-3-chloropropan-2-ol, 7-aminobicyclo[2.2.2]octan-8-ol, 2-aminopyridin-3-ol, 2-amino-4-phenylphenol, 5-aminonaphthalen-1-ol, and 4-(4-aminophenyl)phenol.

In structures I herein, a "substituted" hydrocarbon or hydrocarbyl group may contain any substituents that do not react with carboxylate groups, hydroxyl groups or amino groups under the conditions of the reactions that form the various products of structure I. Therefore, the substituents should exclude groups such as hydroxyl, primary or secondary amino, mercapto, carboxylic acid or salts or esters thereof, carboxylic acid halides, sulfur- or phosphorus-containing acids, isocyanates and the like. In addition, the substituent groups also should not otherwise interfere with the reactions that form the various products of structure I. Suitable substituents include, carbonyl, halogen, tertiary amino, ether, sulfone and the like, among others.

Some specific compounds according to structure I include those having the structure

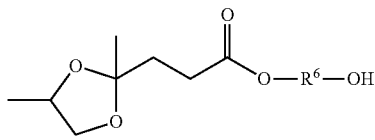

or the structure

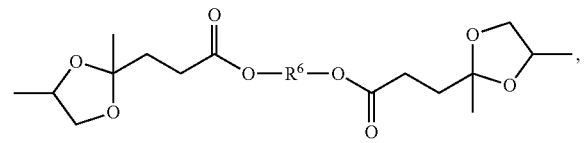

or the structure

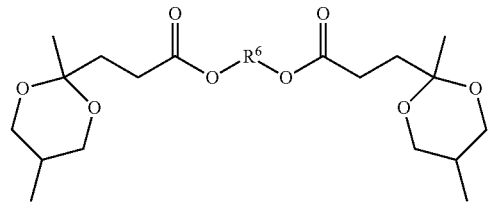

particularly in which $R^6$ is —$(CH_2)$—$_m$ wherein m is from 2 to 18, especially 2, 3, 4 or 6. In one specific embodiment, $R^6$ corresponds to the residue, after removal of hydroxyl groups, of 1,4-butane diol resulting in the structure (Ia)

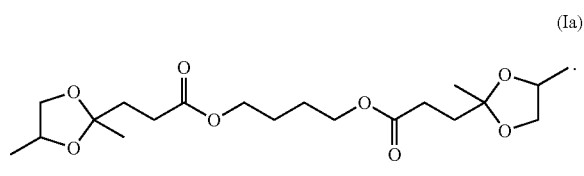

(Ia)

In another specific embodiment, $R^6$ corresponds to the residue, after removal of hydroxyl groups, of diethylene glycol resulting in structure (Ib)

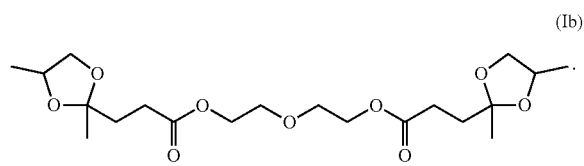

(Ib)

In another specific embodiment, $R^6$ corresponds to the residue, after removal of hydroxyl groups, of 2-methyl, 1-3 propane diol resulting in structure (Ic)

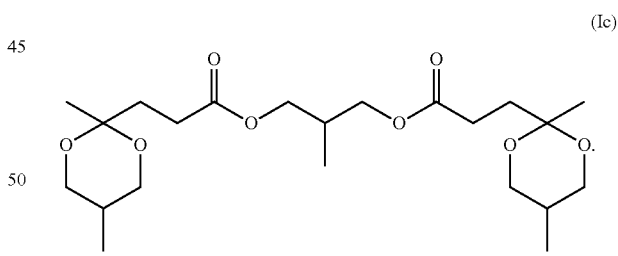

(Ic)

Compounds according to structure I can be prepared in a transesterification or ester-aminolysis reaction between the corresponding polyol, aminoalcohol or polyamine and the corresponding alkyl ketal ester. Alternatively, compounds according to structure I can be prepared by reacting an oxocarboxylic acid with the polyol, aminoalcohol or polyamine to form an ester or amide, and then ketalizing the resulting product with a 1,2- or 1,3-alkane diol such as ethylene glycol, 1,2-propanediol, 1,3-propanediol, 2-methyl, 1-3 propane diol, 1,2-butanediol, 1,3-butanediol, 1,2-pentanediol, 1,3-pentanediol, 1,2-hexanediol, 1,3-hexanediol, and the like. Ketalization is conveniently performed according to the methods described in International Patent Publication No. WO 2009/048874, or U.S. Patent Publication No. 2008/0242721.

A mixture of products is commonly obtained from the synthesis process. For example, it is common for the reaction product to contain a mixture of materials having various values of x and y. It is preferred that no more than 25 mole percent of the product represents compounds in which y is 1 or greater. In specific cases in which the starting polyol is a diol, it is preferred that at least 75 mole of the product is species in which x is 2 and y is zero.

Certain compounds according to structure I may exist as optical and/or geometrical isomers. In such cases, any of the isomers are suitable.

The transesterification reactions that are used to form the compounds of structure I can be carried out in the presence of an inert solvent, such as hexane, toluene, dichlorobenzene and the like. In other embodiments the reaction is carried out neat. In some embodiments, the reaction is performed at temperature and pressure conditions such that the condensation coproduct, i.e., an alcohol in most cases but water in some cases, evaporates from the reaction mixture, wherein the vapor is condensed and thereby removed. In some embodiments, a temperature between about 60° C. and 300° C. is employed; in other embodiments, a temperature of about 100° C. to 250° C. is employed; in still other embodiments, a temperature of about 160° C. to 240° C. is employed to accomplish the reaction. In some embodiments, pressure in the reaction vessel is lowered to below atmospheric pressure to assist in the removal of the condensation by-product, i.e., the alcohol or water. In some embodiments, nitrogen is sparged or swept through the reaction mixture to assist in the removal of the coproduct alcohol.

The various reactions described above are typically performed in the presence of a catalyst. While the choice of catalyst employed in the reactions is not particularly limited within the scope of the disclosure, a preferred set of embodiments employs metallic catalysts, for example, a catalyst based on titanium, aluminum, zirconium, or tin, such as titanium tetraisopropoxide (Ti(OiPr)$_4$), or tin (II) octanoate, or organic zirconates. Other suitable catalysts are, for example, organic titanates and zirconates marketed under Tyzor® brand by DuPont de Nemours and Co. of Wilmington, Del. In some embodiments, more than one species of catalyst is used; thus, blends of one or more catalysts such as those mentioned above may be used in a mixture to catalyze the formation of compounds of structure I.

In some embodiments, catalysts such as inorganic bases, including sodium methoxide, sodium ethoxide, calcium acetate, and potassium methoxide, can be used. Organo-ammonium and organo-phosphonium catalysts can be used, such as tetramethylammonium hydroxide, tetrabutyl phosphonium hydroxides and acetates. Strong acid catalysts, including camphorsulfonic acid or sulfuric acid can be used in ketalization and esterification reactions. Catalysts are used in amounts suitable to catalyze the reaction. In embodiments, the amount of organometallic catalyst employed is about 5 to 50,000 ppm based on the weight of the total weight of reagents, or about 10 to 500 ppm based on the total weight of reagents.

In some embodiments, the catalyst is incorporated into, or onto, or covalently bound to, a solid support material. Resin beads, membranes, porous carbon particles, zeolite materials, and other solid support materials may be functionalized with catalytic moieties that are, in embodiments, covalently bound or strongly sorbed to one or more surfaces of the solid support.

In some embodiments, it is desirable to deactivate the catalyst after the reaction is complete. Deactivation is useful in embodiments, for example, where distillation or a high temperature process or application is to be employed. Deactivation is accomplished by any convenient technique; the method is not particularly limited by the method of deactivation. Examples of deactivating materials include phosphite compounds such as water, and phenol based compounds such as IRGAFOS® 168 and PEP-Q®, or IRGANOX® MD1024 (BASF®; Ludwigshafen am Rhein, Germany), and carboxylic acids such as salicylic acid and the like.

The various synthesis reactions described herein can be carried out batch wise or in continuous mode, depending on equipment, scale, and other reaction parameters. The reaction vessel may be made of any suitable material. In some embodiments, the reagents are dried before addition of catalyst, using any convenient technique. In embodiments, drying is accomplished by warming the reaction vessel to about 60° C.-110° C. and applying a vacuum of 5-20 Torr for at least about an hour; in other embodiments a dry inert gas, such as nitrogen or argon, is swept continuously through the vessel instead of applying a vacuum. The reagents are, in some embodiments, analyzed for water content prior to addition of catalyst to the vessel. In other embodiments, the reagents are dried separately prior to addition to the reaction vessel and are introduced to the vessel by a closed system, such as by pipes or tubes, which does not entrain water or air during introduction of the reagents to the vessel.

The catalyst may be added batchwise or in continuous fashion to the vessel. In embodiments, during the addition of catalyst, the reagents are at the same temperature as employed during drying. In other embodiments the reagents are preheated to a targeted temperature, for example in the ranges specified above, prior to addition of the catalyst. After catalyst addition, in some embodiments, a vacuum is employed to remove any air that has become entrained during the addition. In other embodiments, the catalyst is introduced to the vessel by a closed system, such as by pipes or tubes that do not entrain water or air during introduction of the reagents to the vessel. The reaction is, in embodiments, carried out under an inert gas blanket or an inert gas sparge, and agitated using any convenient means of agitation.

In embodiments, the reaction is complete in less than about 2 hours; in other embodiments the reaction is complete between about 1 hour and 12 hours; in still other embodiments the reaction is complete in about 2 to 8 hours. In some embodiments, the limiting reagent in the reaction is metered in gradually by employing an addition funnel, metered pump, or another apparatus known in the industry. Metering of a reagent is, in embodiments, initiated after or during addition of the catalyst and is particularly useful where the reaction is accomplished in a continuous process.

If desired, the crude reaction product can be purified using any convenient techniques, one of which is distillation. A distillation may be performed under reduced pressure or with the aid of nitrogen sparging. It is preferred to perform the distillation in a way that minimizes heat history. Therefore, this step is preferably performed below temperatures at which degradation, color formation, or another side reaction occurs, or if such temperatures are used, the distillation should be performed to minimize the exposure time of the product to such temperatures. In some embodiments, it is desirable to maintain temperatures at or below 200° C. during purification. In other embodiments, it is desirable to maintain temperatures at or below 175° C. during purification. Techniques such as wiped film evaporation, falling film evaporation, and membrane pervaporization are useful. Purification is carried out either with or without prior deactivation of the catalyst.

In some cases, in which mixtures of reaction products are obtained, it may be desirable to separate one or more of those reaction products from the mixture of reaction products, in order to obtain a product that is enriched in (or even consists of) a specific compound or mixture of compound. This can be performed by any suitable technique, including distillation, solvent extraction, chromatographic methods, and the like.

The plasticizer blend composition of the present invention includes a second compound in addition to those described above. A variety of plasticizer materials may be used in different embodiments, such as cycloaliphatics, such as DINCH, citrates such as tributylacetyl citrate, phosphates such as tri-2-ethylhexyl phosphate, trioctyl phosphate such as 2-ethylhexyl-isodecyl phosphate, di-2-ethylhexyl phenyl phosphate, triphenyl phosphate and tricresyl phosphate, ortho phthalates, such as dibutyl phthalate, diisononyl phthalate (DINP), diiodecyl phthalate, butyl benzyl phthalate, other dialkyl phthalates, or those containing up to 6 carbons per alkyl chain (linear or branched) or those containing greater than 7 carbons per alkyl chain (linear or branched), such as DUP (diundecyl phthalate), terephthalates, such as dioctyl terephalate (DOTP), diisononyl terephthalate (DINTP), aliphatic esters, such as 2,2,4-trimethyl1-1,3pentanediol diisobutyrate, adipates, succinates, citrates, maleates, azelates, and sebacates, trimellitates, such as tri-2-ethylhexyl trimellitate (TOTM) and triisononyl trimellitate (TINTM), benzoate esters, such as dipropylene glycol dibenzoate, diethylene glycol dibenzoate, triethylene glycol dibenzoate, and propylene glycol dibenzoate, sulfonates such as the phenyl cresyl esters of pentadecyl sulfonic aromatic sulfonic acid esters available from Bayer AG of Leverkusen, Germany as MESAMOLL™, vegetable oils, such as epxodized vegetable oils, epoxidized soybean oil, hydrogenated vegetable oils, fatty acid vegetable oil transesters, akylated vegetable transesters and glyceryl esters, hydrogenated and acetylated vegetable oils such as castor oils, phosphates, polymeric plasticizers, such as adipic, glutaric, azaleic, sebacic, phthalic, terephthalic and citric, and biobased plasticizers, such as those offered for sale by Galata, including those sold under the DRAPEX ALPHA 200 series, those offered for sale by ADM and PolyOne, including those sold under the Reflex tradename,), those based on isosorbide, such as Polysorb ID37 by Roquette, Soft-N-Safe (sold by Danisco) and plasticizers based on furanics and the like.

In some embodiments, the second compound of the plasticizer composition is selected from a cycloaliphatic compound, an ortho phthalate compound, a terephthalate compound, a benzoate ester compound and a bio-based compound.

In some embodiments, the second compound of the plasticizer blend includes compounds having the Structure (II)

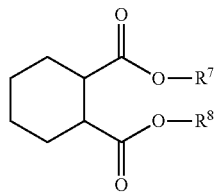

wherein $R^7$ and $R^8$ are each independently an optionally substituted linear or branched alkyl each having between 6 and 10 carbon atoms, specifically each $R^7$ and $R^8$ are each linear or branched alkyl each having 9 carbon atoms. Some specific compounds according to structure II include those having the structure (IIa)

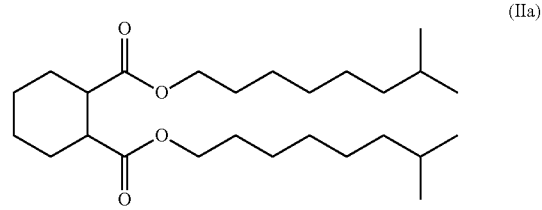 [SMILES: CC(C)CCCCCCOC(=O)C1CCCCC1C(=O)OCCCCCCC(C)C]

or the structure (IIb)

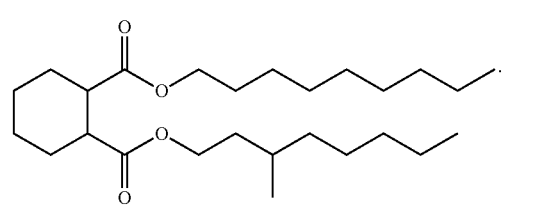

Compounds according to structures IIa and IIB are known as 1,2-cyclohexane dicarboxylic acid, di-isononyl ester. Compounds according to structure IIa are available, for example, from the BASF Corporation under the name Hexamoll® DINCH®. Compounds according to structure IIb are available, for example, from the Evonik Industries under the name Elatur®.

In other embodiments, the second compound of the plasticizer blend includes a benzoate ester, such as dipropylene dlycol dibenzoate commonly referred to as DPGDB and having the structure (IV):

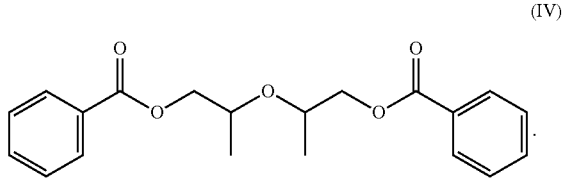 [SMILES: CC(COC(=O)c1ccccc1)OC(C)COC(=O)c1ccccc1]

In other embodiments, the second compound of the plasticizer blend includes an ortho phthalate compound, such as diisononyl phthalate, commonly abbreviated DINP and having the structure (V)

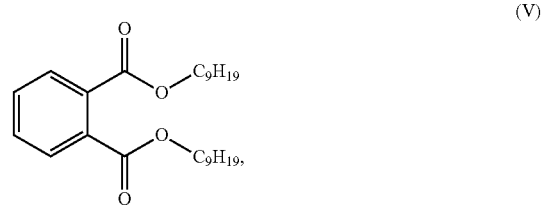

or n-butyl benzyl phthalate commonly referred to as BBP and having the structure (III):

(III)

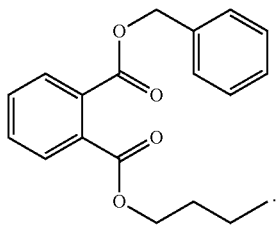

In other embodiments, the second compound of the plasticizer blend includes a terephthalate compound, such as dioctyl terephthalate (bis(2-ethylhexyl) benzene-1,4-dicarboxylate, or di(ethylhexyl) terephthalate), commonly abbreviated DOTP and having the structure (VI)

(VI)

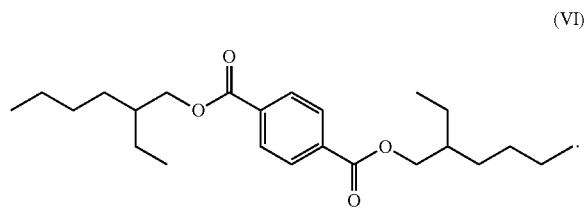 [SMILES: CCCCC(CC)COC(=O)c1ccc(C(=O)OCC(CC)CCCC)cc1]

The plasticizer blends of the present invention can be blended in a variety of ratios or amounts depending upon the desired properties in the finished article.

In some embodiments, the plasticizer composition comprises at least 1%, 2%, 3%, 4%, 5%, 6%, 7%, 8%, 9% or 10% by weight of the first compound of Structure (I). In other embodiments, the plasticizer composition comprises at least 20%, more specifically at least 30%, more specifically at least 40%, more specifically at least 50%, more specifically at least 60%, more specifically at least 70%, more specifically at least 80%, more specifically at least 90%, and more specifically at least 95% by weight of the compound of Structure (I).

In some embodiments, the plasticizer composition comprises at least 1%, 2%, 3%, 4%, 5%, 6%, 7%, 8%, 9% or 10% by weight of the second compound. In other embodiments, the plasticizer composition comprises at least 20%, more specifically at least 30%, more specifically at least 40%, more specifically at least 50%, more specifically at least 60%, more specifically at least 70%, more specifically at least 80%, and more specifically at least 90%, and more specifically at least 95% by weight of the second compound.

Plasticizer compositions including blends of the first and second compounds are useful components in compositions that also contain an organic polymer. A very wide range of organic polymers is useful, depending of course on particular applications. The organic polymer may be thermoset or thermoplastic.

Many plasticizer compositions of the present invention have Hildebrand Solubility Parameters ("HSP") of at least 12 $(MPa)^{1/2}$, quite typically from 12 to 20 $(MPa)^{1/2}$. Such compounds tend to be quite compatible with organic polymers having Hildebrand Solubility Parameters ("HSP") of about 16 $(MPa)^{1/2}$ or greater, therefore preferred compositions are those in which the organic polymer has a Hildebrand Solubility Parameters ("HSP") of about 16 $(MPa)^{1/2}$ or greater. The good compatibility of these tends to make the compound of structure I difficult to extract from the composition, and also makes the composition less likely to exude or leach the plasticizer material. Extractability in various extractants such as hexanes, soapy water, and mineral oil can be evaluated according to the ASTM D 1239 procedure; weight losses on this test are preferably no greater than 2% and still more preferably no greater than 1% for preferred compositions of the invention. Migration of a plasticizer from an article causes increased exposure of the plasticizer to the environment. The increased exposure can cause adhesive failure, cracking of materials in contact with the article, and contamination of fluids in contact with the article. Additionally, migration out of the articles can lead to stiffening, loss of performance and increase in $T_g$.

Some examples of suitable organic polymers include poly(vinyl chloride), poly(vinylidene chloride), polyhydroxyalkanoates, poly(lactic acid), polystyrene, polycarbonates, polyurethanes or ureas, acrylic polymers, styrene-acrylic polymer, vinyl-acrylic polymers, ethylene-vinyl acetate polymers, polyesters, polyamides, polyethers, acrylonitrile-butadiene-styrene polymers, styrene-butadiene-styrene polymers, polyvinyl acetate, poly(vinyl butyrate), polyketal esters and copolymer thereof, cellulosics, thermoplastic elastomers, or random, graft, or block copolymers thereof or mixtures thereof.

Compounds according to structures I are generally renewable bio-based feedstocks, wherein "bio-based" is used as defined in ASTM D6866. As such, these compounds offer opportunities to replace petroleum-based products such as plasticizer with bio-based materials. Such a bio-based compound can be blended with a bio-based organic polymer to form a polymer composition which is also bio-based. One such polymer is poly(lactic acid), or PLA. Compounds according to structures I are good plasticizers for PLA. Compounds of structure I often have high permanence in PLA compared to other compatible plasticizers.

The plasticizer compositions of the present invention may be incorporated into an organic polymer composition using any suitable technique such as mechanical blending or compounding, melt blending, solution blending and the like. When the organic polymer is a thermoset, the compound may be blended into one or more precursor materials, which are subsequently cured or otherwise polymerized to form the thermosetting polymer.

A composition containing a plasticizer compositions of the present invention and an organic polymer may take the form of a homogeneous blend, a dispersion of one component into the other, or, in some cases, that of a continuous liquid phase into which the organic polymer is dispersed in the form of polymer particles. The mixture of the plasticizer compositions of the present invention and the organic polymer may form the disperse phase in an emulsion or dispersion in another material, which serves as a continuous liquid phase, as is the case with a latex. The mixture of the plasticizer compositions of the present invention and the organic polymer may be plastisols, pellets, or dry blends.

The relative amounts of the plasticizer compositions of the present invention and the organic polymer may vary considerably. In various embodiments, the organic polymer may constitute from 1 to 99.9%, from 2 to 99%, from 5 to 98%, from 10 to 96%, from 30 to 96%, from 65 to 90% or from 40 to 60% of the combined weight of polymer and the plasticizer compositions of the present invention.

Plasticizer compositions of the present invention often perform a plasticizing function when blended with organic polymers. When plasticizer compositions of the present invention are to perform such a function, it is preferably liquid at room temperature or, if a solid at room temperature, it has a glass transition temperature and/or softening temperature below room temperature, often 0° or −20° C. Plasticization is indicated by a reduction in $T_g$ of the composition, compared to that of the neat organic polymer, and/or a softening or flexibilizing effect, as indicated by a reduction in Shore hardness and/or a lowered flexural modulus, respectively. Typically, the combination of the organic polymer and the plasticizer compositions of the present invention will have a $T_g$ of at least 5° C. lower at least 15° C. lower, at least 30° C. lower, or at least 50° C. lower than a $T_g$ of the neat polymer, as measured by DSC according to ASTM D3418 or other DSC method. A useful general procedure is as follows: The sample is evaluated on a TA Q200 instrument with refrigerated cooling and TA Thermal Advantage software (TA Instruments; New Castle, Del.), or equivalent, using a ramp rate of 20° C./min. Samples are ramped from room temperature to 210° C. followed by a rapid quench. Samples are then reheated to 210° C. at a rate of 20° C./min. Glass transition temperature is measured on the second scan.

When used to perform a plasticizing function, plasticizer compositions of the present invention preferably have viscosities less than about 500 centipoise (cP) at 25° C. The viscosity may be from about 1 cP to 250 cP; or about 50 cP to 200 cP at 25° C. Low viscosity provides ease of compounding into one or more polymer compositions without, for example, preheating or addition of diluents or solvents to lower viscosity and enables the creation of pastes such as plastisols.

In certain embodiments, at least a portion of the plasticizer composition of the present invention is in a liquid phase of a plastisol. As used herein, the term "plastisol" means a flowable suspension or solution of polymer particles in a plasticizer composition that forms a solid, flexible, plasticized polymer product with the addition of heat. A preferred polymer phase is polyvinylchloride, although other polymer particles can be used.

A plastisol in accordance of the invention may contain from 1 to 90%, more specifically, 2 to 90%, more specifically, 5 to 90%, more specifically, 7 to 90%, more specifically, 8 to 90%, more specifically, 9 to 90%, and more specifically, 10 to 90% by weight of a plasticizer composition of the present invention. In one embodiment a plastisol formulation comprises an organic polymer, specifically, polyvinylchloride, and at least 5%, more specifically, at least 10%, more specifically, at least 15%, more specifically, at least 20%, more specifically, at least 25%, and more specifically, at least 30% by weight of a plasticizer composition, wherein the plasticizer composition comprises a blend of i) a first compound selected from a compound having the Structure (Ia):

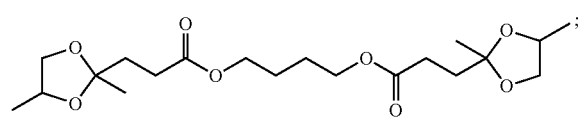

(Ia)

a compound having the structure (Ib):

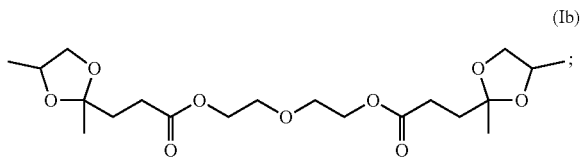

(Ib)

and
a compound having the Structure (Ic):

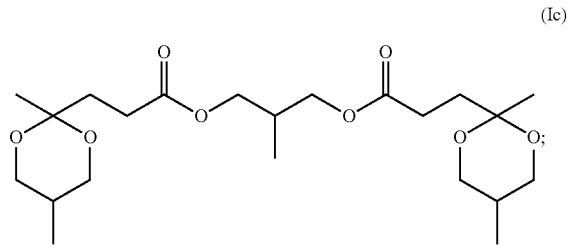 [SMILES: CC(COC(=O)CCC1(C)OCC(C)CO1)COC(=O)CCC1(C)OCC(C)CO1]

(Ic)

and
ii) a second compound selected from a compound having the Structure (II)

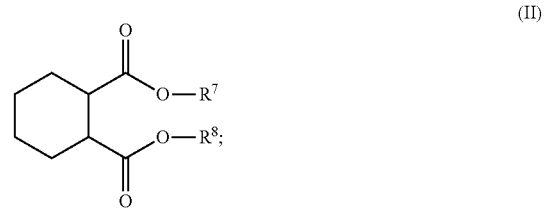

(II)

or
a compound having any of the structures (III-VI):

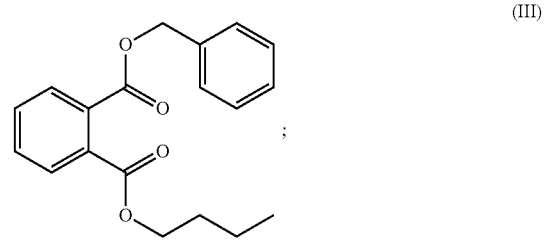 [SMILES: CCCCOC(=O)c1ccccc1C(=O)OCc1ccccc1]

(III)

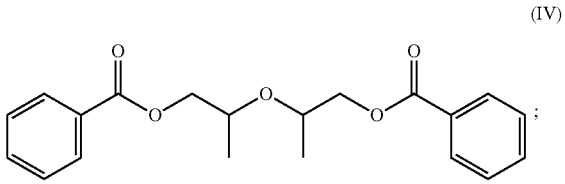 [SMILES: CC(COC(=O)c1ccccc1)OC(C)COC(=O)c1ccccc1]

(IV)

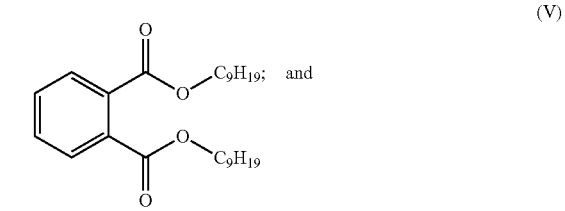

(V)

(VI)

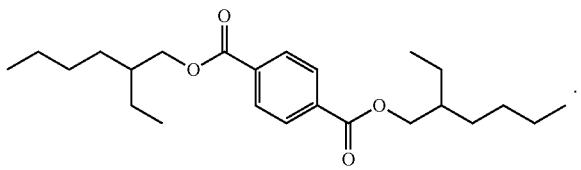

In one embodiment, the plasticizer composition comprises from 1 to 90% of the combined weights of the plasticizer composition and the polymer.

In some embodiments, Structure II is specifically selected from (IIa and IIb):

(IIa)

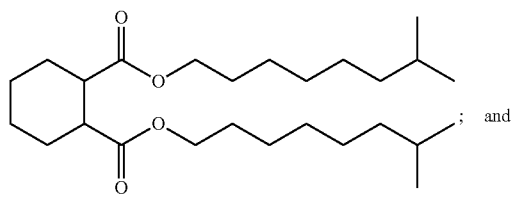
; and (IIb)

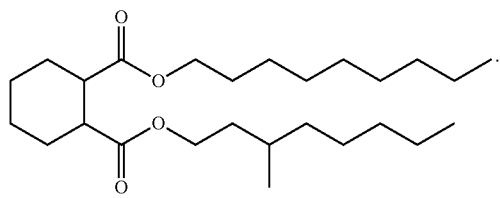
.

In one embodiment, the plasticizer composition comprises at least 1%, at least 2%, at least 3%, at least 4%, at least 5%, at least 6%, at least 7%, at least 8%, at least 9%, or at least 10%, by weight of the compound of Structure (Ia). In other embodiments, the plasticizer composition comprises at least 20%, more specifically at least 30%, more specifically at least 40%, more specifically at least 50%, more specifically at least 60%, more specifically at least 70%, more specifically at least 80%, and more specifically at least 90% by weight of the compound of Structure (Ia).

In one embodiment, the plasticizer composition comprises at least 1%, at least 2%, at least 3%, at least 4%, at least 5%, at least 6%, at least 7%, at least 8%, at least 9%, or at least 10%, by weight of the compound of Structure (Ib). In other embodiments, the plasticizer composition comprises at least 20%, more specifically at least 30%, more specifically at least 40%, more specifically at least 50%, more specifically at least 60%, more specifically at least 70%, more specifically at least 80%, and more specifically at least 90% by weight of the compound of Structure (Ib).

In one embodiment, the plasticizer composition comprises at least 1,%, at least 2%, at least 3%, at least 4%, at least 5%, at least 6%, at least 7%, at least 8%, at least 9%, or at least 10%, by weight of the compound of Structure (Ic). In other embodiments, the plasticizer composition comprises at least 20%, more specifically at least 30%, more specifically at least 40%, more specifically at least 50%, more specifically at least 60%, more specifically at least 70%, more specifically at least 80%, and more specifically at least 90% by weight of the compound of Structure (Ic).

In some embodiments, the plasticizer composition comprises at least 1%, at least 2%, at least 3%, at least 4%, at least 5%, at least 6%, at least 7%, at least 8%, at least 9%, or at least 10%, by weight of the second compound. In other embodiments, the plasticizer composition comprises at least 20%, more specifically at least 30%, more specifically at least 40%, more specifically at least 50%, more specifically at least 60%, more specifically at least 70%, more specifically at least 80%, and more specifically at least 90% by weight of the second compound.

In another embodiment, a plastisol formulation of the invention includes:

i) between about 30-90% by weight of a polyvinyl chloride polymer;

ii) between about 5-30% by weight of a first compound having the Structure (Ia):

(Ia)

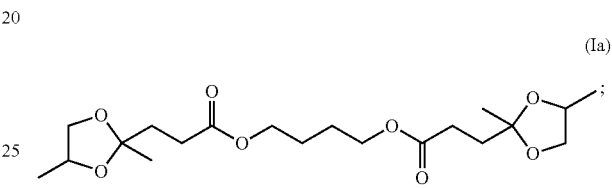
;

or Structure (Ib):

(Ib)

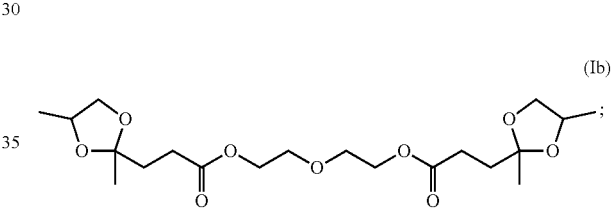
;

or Structure (Ic):

(Ic)

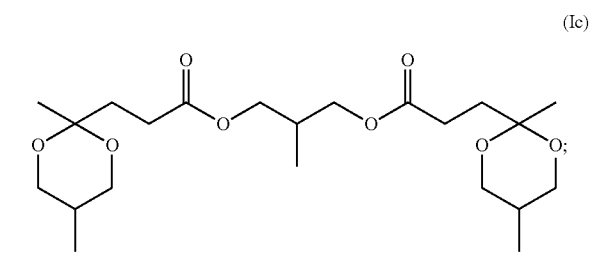
;

and iii) between about 5-30% by weight a second compound selected from a cycloaliphatic compound, an ortho phthalate compound, a terephthalate compound, a benzoate ester compound, and a bio-based compound.

In some embodiments, the second compound is an ortho phthalate compound. In one embodiment, the ortho phthalate compound has the structure:

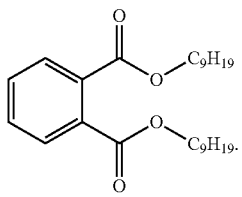

In another embodiment the ortho phthalate compound has the structure:

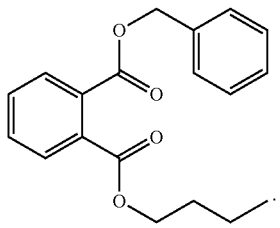
(III)

In some embodiments, the second compound is a terephthalate compound. In one embodiment the terephthalate compound has the structure:

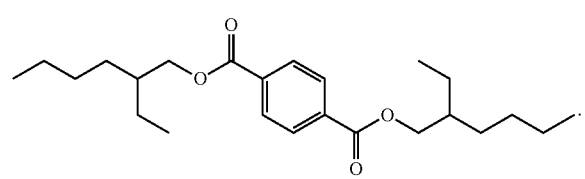
(VI)

In some embodiments, the second compound is a benzoate ester compound. In one embodiment the benzoate ester compound has the structure:

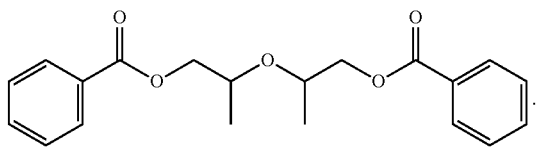
(IV)

In some embodiments, the second compound is a cycloaliphatic compound. In some embodiments the cycloaliphatic compound has a structure corresponding to Structure II

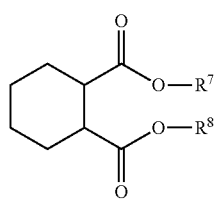
(II)

wherein Wand $R^8$ are each independently an optionally substituted linear or branched alkyl each having between 6 and 10 carbon atoms. In some embodiments the cycloaliphatic compound is selected from the group consisting of:

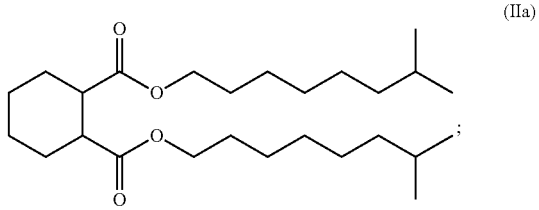
(IIa)

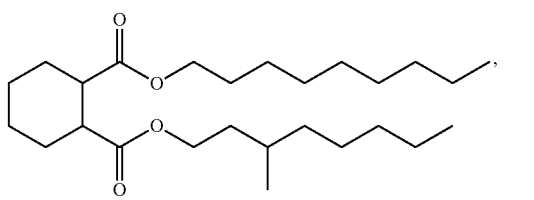
(IIb)

and combinations thereof.

Polymer plastisols are, in embodiments, poured or deposited into a mold or onto a surface where the subsequent addition of heat causes the suspension to form a solid, flexible mass. In other embodiments, articles are dipped into the plastisol to form a coating on the article's surface. In such embodiments, it is important for the plasticizer to cause "fusing", which means for the purposes of discussion that the polymer particle boundaries of the plastisol are broken by the effect of the plasticizer, causing mixing of the polymer on a molecular scale, wherein the effect persists to the solid state. Compounds of Structure I of the present invention often function well as "fast fusing plasticizers," which means that they shorten the time required for the polymer particle boundaries of the plastisol to be broken and mixing to occur, lower the temperature required for the polymer particle boundaries of the plastisol to be broken and mixing to occur, or both.

Plastisols in accordance with the invention are useful in the production of sheet stock or films, flooring, tents, tarpaulins, coated fabrics such as automobile upholstery, in car underbody coatings, in moldings and other consumer products. Plastisols are also used in medical uses such as blood bags and multilayered sheets and films, tubing, footwear, fabric coating, toys, flooring products and wallpaper. Plastisols typically contain 20 to 700 parts by weight, more typically 40 to 200 parts by weight, more typically 50 to 150 parts by weight, more typically 70 to 120 parts by weight of plasticizer per 100 parts of PVC resin. PVC plastisols are usually made from PVC that has been produced by emulsion polymerization.

In certain embodiments, plasticizer compositions of the present invention are contained in a PVC plastisol composition containing from 25 to 600 parts by weight, 40 to 200 parts by weight, or 50 to 150 parts by weight, or 70 to 120 parts by weight, or 90 to 110 parts by weight of the compound per 100 parts of PVC. Such plastisol compositions tend to have stable viscosities; their viscosities tend to increase less than about 200% over a period of 14 days when stored at a temperature between about 20° C. to 25° C., or less than about 100%, preferably less than 70% and more preferably less than 50% when stored at a temperature of between about 20° C. to 25° C. for five days.

In another embodiment of the present disclosure, a process for the production of flexible PVC articles is provided, whereby a layer is formed from a plastisol containing from 25 to 600 parts by weight, 40 to 200 parts by weight, or 50 to 150 parts by weight, or 70 to 120 parts by weight, or 90 to 110 parts by weight of the plasticizer compositions of the present invention per 100 parts by weight of PVC, and subsequently fusing the layer by the application of heat.

A polymer composition, dry blend or plastisol in accordance with the invention may further contain one or more additional plasticizers (a third plasticizer) such as cycloaliphatics, such as DINCH, citrates such as tributylacetyl citrate, phosphates such as tri-2-ethylhexyl phosphate, trioctyl phosphate such as 2-ethylhexyl-isodecyl phosphate, di-2-ethylhexyl phenyl phosphate, triphenyl phosphate and tricresyl phosphate, ortho phthalates, such as dibutyl phthalate, diisononyl phthalate (DINP), diiodecyl phthalate, butyl benzyl phthalate, other dialkyl phthalates, or those containing up to 6 carbons per alkyl chain (linear or branched) or those containing greater than 7 carbons per alkyl chain (linear or branched), such as DUP (diundecyl phthalate), terephthalates, such as dioctyl terephalate (DOTP), diisononyl terephthalate (DINTP), aliphatic esters, such as 2,2,4-trimethyll-1,3pentanediol diisobutyrate, adipates, succinates, citrates, maleates, azelates, and sebacates, trimellitates, such as tri-2-ethylhexyl trimellitate (TOTM) and triisononyl trimellitate (TINTM), benzoate esters, such as dipropylene glycol dibenzoate, diethylene glycol dibenzoate, triethylene glycol dibenzoate, and propylene glycol dibenzoate, sulfonates such as the phenyl cresyl esters of pentadecyl sulfonic aromatic sulfonic acid esters available from Bayer AG of Leverkusen, Germany as MESAMOLL™, vegetable oils, such as epxodized vegetable oils, epoxidized soybean oil, hydrogenated vegetable oils, fatty acid vegetable oil transesters, akylated vegetable transesters and glyceryl esters, hydrogenated and acetylated vegetable oils such as castor oils, phosphates, polymeric plasticizers, such as adipic, glutaric, azaleic, sebacic, phthalic, terephthalic and citric, and biobased plasticizers, such as those offered for sale by Galata, including those sold under the DRAPEX ALPHA 200 series, those offered for sale by ADM and PolyOne, including those sold under the Reflex tradename), those based on isosorbide, such as Polysorb ID37 by Roquette, Soft-N-Safe (sold by Danisco) and plasticizers based on furanics and the like.

In general, polymer compositions in accordance with the invention may further include one or more crosslinkers, adjuvants, antioxidants, acid scavengers, colorants (such as pigments or dyes), antifouling agents, tougheners, solvents, fillers, metal particulates, odor scavenging agents, lubricants, thermal stabilizers, light stabilizers including UV stabilizers, flame retardant additives, pigments, blowing agents, processing aids, impact modifiers, coalescing solvents, or a combination thereof.

These additives can be in any amount, such as between 0.1 and 90% by weight of the total weight of the formulation, more specifically, between 0.1 and 70% by weight of the total weight of the formulation, more specifically, between 0.1 and 50% by weight of the total weight of the formulation, and more specifically, between 0.1 and 10% by weight of the total weight of the formulation. In other embodiments, these additives can be in any amount, such as between 30 and 90% by weight of the total weight of the formulation, more specifically, between 40 and 80% by weight of the total weight of the formulation, more specifically, between 50 and 70% by weight of the total weight of the formulation, and more specifically, between 50 and 60% by weight of the total weight of the formulation. In one embodiment, the compositions of the invention further include a pigment or filler.

In one embodiment, the polymer and plasticizers are combined prior to combining with the further components, such as pigments or fillers. In another embodiment, the plasticizers are combined with the further components, such as pigments or fillers, prior to combining with the polymer. In another embodiment, the polymer is combined with the further components, such as pigments or fillers, prior to combining with the plasticizers.

The useful, optional additives include, but are not limited to, trimethyl pentanyl diisobutyrate, dialkyl isophthalates, dialkyl terephthalates, alkyl benzyl phthalates, dialkyl adipates, trialkyl trimellitates, alkylyl trialkyl citrates, dialkyl azelates, dialkyl glutarates, dialkyl sebacates, dialkyl cyclohexanedicarboxylates, dialkyl sulfonates, esters of pentaerythritol, esters of glycerol, esters of fatty acids, glycol dibenzoates, epoxidized soybean oil, any of the additives described in International Patent Application Nos. PCT/US08/79337 or PCT/US09/40841, or a mixture of any of these additional additives. One or more of the alkyl, dialkyl, or trialkyl groups are, in embodiments, n-butyl, n-pentyl, n-hexyl, n-heptyl, n-octyl, n-nonyl, n-decyl, n-undecyl, n-dodecyl, capryl, cyclohexyl, 2-ethylhexyl, isobutyl, isopentyl, isohexyl, isoheptyl, isooctyl, isononyl, isodecyl, isoundecyl, or a mixture thereof. In embodiments, the alkylyl is acetyl or n-butyryl. In embodiments, the glycol is ethylene glycol, propylene glycol, diethylene glycol, or dipropylene glycol. The additional additives are present, in embodiments, as a blend with the plasticizer compositions of the present invention.

Still more, optional materials that may be present in a polymer composition of the invention include, for example, one or more solvents (including coalescing solvents), crosslinkers, antioxidants, acid scavengers, colorants (dyes or pigments), antifouling agents (such as antifungal, antibacterial, or antiviral agents), tougheners, tackifiers, additional polymers, fillers, diluents, viscosity modifying agents, metal particulates, odor scavenging agents, adjuvants, lubricants, heat stabilizers, light stabilizers including UV stabilizers, flame retardant additives, blowing agents, processing aids, impact modifiers, or a combination thereof. The additional materials impart various elements of functionality to the composition, the nature of which depend on the intended use of the composition, for example in one or more articles as will be described below.

Polymer compositions of the invention are useful to form a variety of articles. An "article" as used herein is an item with a discrete shape, such as a tube, a film, a sheet, or a fiber, that incorporates one or more compositions of the disclosure; in some embodiments, the article may have its origin in a composition that undergoes a transformation, such as solidification or evaporation of one or more solvents, to result in the final article. In some embodiments, an article is substantially formed from a polymer composition of the invention; in other embodiments, the polymer composition of the invention forms only one part, such as one layer, of an article.

An article can be formed from a polymer composition of the invention by a wide range of fabrication methods, including for example, coating, casting, calendaring, extrusion, coextrusion, profile extrusion, blow molding, rotomolding, compression molding, thermoforming, injection molding, co-injection molding, reaction injection molding, laminating, milling, dipping, or weaving. Any of these processes can be used alone or in combination to form articles. Where the polymer includes PVC, for example, the article is, in some embodiments, a casing, a pipe, a cable, a wire sheathing, a fiber, a woven fabric, a nonwoven fabric, a coated paper, a film, a window profile, a floor covering, a wall base, an automotive item, a medical item, a toy, a packaging container, a screw closure or stopper adapted for a bottle, a gasket, a sealing compound, a film, a synthetic leather item, an adhesive tape backing, or an item of clothing. In some embodiments, the casing is a casing for an electrical device. In some embodiments, the medical item is medical tubing or a medical bag. In some embodiments, the film is a roofing film, a composite film, an adhesive film, a film for laminated safety glass, or a packaging film. In some embodiments, the packaging container is a food or drink container. In some embodiments, the sealing compound is for sealed glazing. In some embodiments, the automotive item is seat upholstery, an instrument panel, an arm rest, a head support, a gear shift dust cover, a seat spline, a sound-deadening panel, a window seal, a landau top, a sealant, a truck tarpaulin, a door panel, a cover for a console and glove compartment, a trim laminating film, a floor mat, a wire insulation, a side body molding, an underbody coating, a grommet, or a gasket.

In some embodiments, the article comprises two or more layers and the plasticizer composition of the present invention constitutes or is contained within at least one layer. In another embodiment, the article comprises a composition containing a plasticizer composition of the present invention in at least one layer. In some embodiments at least one of the adjacent layers is a polyurethane coating. In some embodiments, the polyurethane layer is UV-cured. In some embodiments at least one of the adjacent layers is a wood composite material. In some embodiments at least one of the adjacent layer is another plasticized polymer layer. In some such embodiments, the other of the two adjacent layers contains a plasticizer that doesn't have a structure corresponding to plasticizer composition of the present invention; the plasticizers include, in various embodiments, other additives. Some examples of such additives include dialkyl phthalates, trimethyl pentanyl diisobutyrate, dialkyl isophthalates, dialkyl terephthalates, alkyl benzyl phthalates, dialkyl adipates, trialkyl trimellitates, alkylyl trialkyl citrates, dialkyl azelates, dialkyl glutarates, dialkyl sebacates, dialkyl cyclohexanedicarboxylates, esters of pentaerythritol, esters of glycerol, fatty acid triglycerides, esters of fatty acids, glycol dibenzoates, epoxidized soybean oil, ortho phthalates, such as those containing up to 6 carbons per alkyl chain (linear or branched) or those containing greater than 7 carbons per alkyl chain (linear or branched), such as DINP or DUP, terephthalates, such as DOTP, aliphatic esters, such as adipates, succinates, citrates, maleates, azelates, and sebacates, trimellitates, such as TOTM and TINTM, benzoate esters, such as dipropylene glycol dibenzoate, diethylene glycol dibenzoate, triethylene glycol dibenzoate, and propylene glycol dibenzoate, sulfonates such as the phenyl cresyl esters of pentadecyl sulfonic aromatic sulfonic acid esters available from Bayer AG of Leverkusen, Germany as MESAMOLL™, vegetable oils, such as epoxidized vegetable oils, epoxidized soybean oil, hydrogenated vegetable oils, fatty acid vegetable oil transesters, akylated vegetable transesters and glyceryl esters, hydrogenated and acetylated vegetable oils such as castor oils, phosphates, polymeric plasticizers, such as adipic, glutaric, azaleic, sebacic, phthalic, terephthalic and citric, and biobased plasticizers, such as those offered for sale by Galata, including those sold under the DRAPEX ALPHA 200 series, those offered for sale by ADM and PolyOne, including those sold under the Reflex tradename,), those based on isosorbide, such as Polysorb ID37 by Roquette, Soft-N-Safe (sold by Danisco) and plasticizers based on furanics and the like and mixtures thereof. A polymer composition, dry blend or plastisol in accordance with the invention may further contain one or more additional plasticizers (a third plasticizer) such as cycloaliphatics, such as DINCH, citrates such as tributylacetyl citrate, phosphates such as tri-2-ethylhexyl phosphate, trioctyl phosphate such as 2-ethylhexyl-isodecyl phosphate, di-2-ethylhexyl phenyl phosphate, triphenyl phosphate and tricresyl phosphate, ortho phthalates, such as dibutyl phthalate, diisononyl phthalate (DINP), diiodecyl phthalate, butyl benzyl phthalate, other dialkyl phthalates, or those containing up to 6 carbons per alkyl chain (linear or branched) or those containing greater than 7 carbons per alkyl chain (linear or branched), such as DUP (diundecyl phthalate), terephthalates, such as dioctyl terephalate (DOTP), diisononyl terephthalate (DINTP), aliphatic esters, such as 2,2,4-trimethyll-1,3pentanediol diisobutyrate, adipates, succinates, citrates, maleates, azelates, and sebacates, trimellitates, such as tri-2-ethylhexyl trimellitate (TOTM) and triisononyl trimellitate (TINTM), benzoate esters, such as dipropylene glycol dibenzoate, diethylene glycol dibenzoate, triethylene glycol dibenzoate, and propylene glycol dibenzoate, sulfonates such as the phenyl cresyl esters of pentadecyl sulfonic aromatic sulfonic acid esters available from Bayer AG of Leverkusen, Germany as MESAMOLL™, vegetable oils, such as epoxidized vegetable oils, epoxidized soybean oil, hydrogenated vegetable oils, fatty acid vegetable oil transesters, akylated vegetable transesters and glyceryl esters, hydrogenated and acetylated vegetable oils such as castor oils, phosphates, polymeric plasticizers, such as adipic, glutaric, azaleic, sebacic, phthalic, terephthalic and citric, and biobased plasticizers, such as those offered for sale by Galata, including those sold under the DRAPEX ALPHA 200 series, those offered for sale by ADM and PolyOne, including those sold under the Reflex tradename,), those based on isosorbide, such as Polysorb ID37 by Roquette, Soft-N-Safe (sold by Danisco) and plasticizers based on furanics and the like.

Certain polymer compositions in accordance with the invention are useful as adhesives, including as adhesive films or adhesive coatings. Such adhesives may include, for example, a poly(vinyl acetate) or vinyl acetate copolymer emulsion.

In some embodiments, the plasticizer compositions of the present invention are useful as plasticizers in nail polish formulations. Polymers useful in nail polish formulations include nitrocellulose, tosylamide-formaldehydes and the like.

The following examples further elucidate and describe the compounds of the disclosure and applications thereof without limiting the scope thereof. All parts and percentages are by weight unless otherwise indicated.

EXAMPLES

The following materials were utilized in the following examples:
Plasticizers:
"PZ1" refers to the structure

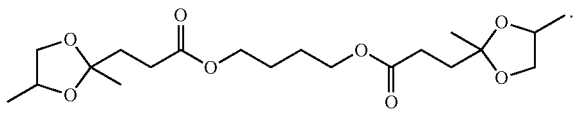

"PZ2" refers to the structure

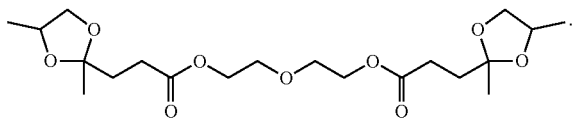

"PZ3" refers to the structure:

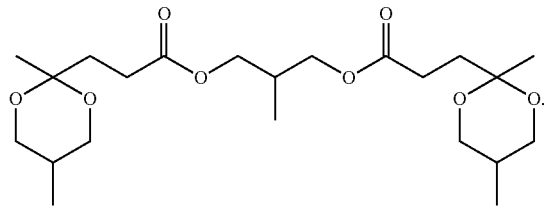 [SMILES: CC(COC(=O)CCC1(C)OCC(C)CO1)COC(=O)CCC1(C)OCC(C)CO1]

"DINCH" refers to Hexamol DINCH available from BASF, which has the structure (IIa)

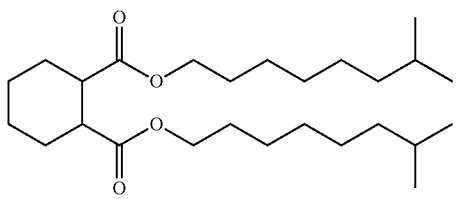

PVC Resins:

GEON 121A: a high molecular weight micro-suspension grade (K=74) from PolyOne. It is recommended for medium and high density foam, spread and spray coating, dip coating and molding.

Vinnolit P70: a medium to high molecular weight dispersion resin (K=70) with an extremely low emulsifier content. It is suitable for outdoor applications like textile constructions, roofing sheets, tar-paulins, awnings, decorative films and transparent top coats.

Vinnolit E68CF: a medium molecular weight dispersion resin (K=68) with a medium emulsifier content. It is suitable especially for chemically blown films.

Example 1

A 250 mL 3-neck round bottom flask is charged with 18.02 g (0.2 mol) of 1,4-butanediol ((BDO) Sigma Aldrich Company, St. Louis, Mo.) and 121.35 g (0.6 mole) of 1,2-propylene glycol ketal of ethyl levulinate (0.14% ethyl levulinate and no detectible propanediol). The contents of the flask are stirred at a pressure of 6 torr while heating to 90° C. Then 3.22 μL of a titanium tetra-isopropoxide is added into the flask. A nitrogen purge is maintained and the contents of the flask are heated to 200° C. for 3 hours, during which time a condensate forms. The reaction mixture is allowed to cool to 110° C., and distillation of a second liquid is accomplished under reduced pressure of about 7 torr. The reduced pressure is maintained until no further distillate is collected. The flask is allowed to cool to ambient temperature and the pressure is equilibrated to atmospheric pressure.

The reaction product contains about 87.2% of the compound corresponding to

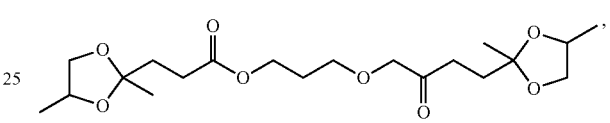

about 1.1% of the compound corresponding

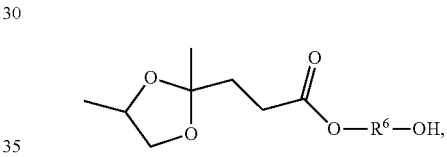

wherein $R^6$ is —$(CH_2)_4$— and about 0.6% of 1,2-propylene glycol ketal of ethyl levulinate. The product also contains some oligomerized materials.

Example 2

The product of Example 1 is pre-mixed with poly(vinyl chloride) ((PVC), $M_n$=55,000, $M_w$=97,000) at 50 parts plasticizer per hundred parts PVC. The premix is separately blended for 10 minutes in a twin screw extruder operated at 165° C.-170° C. under a continuous nitrogen ($N_2$) purge to form Example 2. Shore A Hardness of the resulting blend is measured according to ASTM D 2240. $T_g$ is measured using standard DSC techniques. Example 2 has a $T_g$ of −9.7° C. and a Shore A hardness of 81.5. The PVC by itself has a $T_g$ of 67.2° C.

Example 3

A 5-gallon Parr Model 4557 reactor (Parr Instrument Co., Moline, Ill.) is charged with 12.74 kg (63 moles) of 1,2-propylene glycol ketal of ethyl levulinate and 1.89 kg (20.97 moles) 1,4-butanediol (Sigma-Aldrich Company; St. Louis, Mo.). The contents of the reactor are stirred at 50 rpm at a pressure of 52 torr; the recirculating chiller is operating at −10° C. and the high temperature circulator is operating at 70° C. The reaction mixture is purged with dry nitrogen for about 16 hours. Then, a vacuum of 4-5 Torr is applied to the reactor for about 2 hours. 0.358 g (1.26 mmoles) titanium (IV) isopropoxide (Sigma-Aldrich Company, St. Louis, Mo.) is admixed with 4 mL of 1,2-propylene glycol ketal of ethyl levulinate and added to the reactor. The reaction mixture is purged for about 20 minutes with dry nitrogen followed by the high temperature circulator set at 200° C.

The contents of the reactor are heated to about 200° C. for 3 hours, during which time a condensate is collected. At about 97.2% conversion, the reactor is cooled with an applied vacuum of 20-25 torr, by reducing the high temperature circulator set point to 200° C. Distillation is continued by applying a vacuum of about 5 Torr to the reactor until condensate formation is discontinued. The contents of the reactor are analyzed by GC-FID. Distillation is then restarted and continued as described above until subsequent analysis reveals that the concentration of 1,2-propylene glycol ketal of ethyl levulinate is less than about 1.0%. When distillation is complete, the reactor is cooled to ambient temperature.

The reaction product contains about 90.77% of a material according to structure I in which a is 2, b is 0, x is 1, y is 1, $R^1$ is —$CH_3$, $R^3$ is $CH(CH_3)$, $R^4$ is methylene, $R^6$ is —$(CH_2)_4$—, and each Z is —O—.

Example 4

100 parts of a suspension grade PVC powder (Type 2095 Georgia Gulf Corporation, Atlanta, Ga.) are blended with 2.5 parts of a stabilizer (ThermChek-SP175, Ferro Corporation, Cleveland, Ohio) and then with 5 parts of epoxidized soybean oil.

The resulting mixture is then blended with 50 parts of the product of Example 3 to form Example 4. Blending is performed on an orbital mixer for about 5 minutes. The mixture is transferred into the feed hopper of a 27 mm BRABENDER® (model # DR2051) PolySpede twin-screw extruder (C.W. BRABENDER® Instruments, Inc., South Hackensack, N.J.). The material is extruded at 150° C. with a screw speed of 65 rpm through a 2 mm rod die. The material is cooled by a water bath and fed into a Brabender pellitizer.

Pelletized extrudates are fed into a Nissei injection molding machine (Model # PS04E5A; Nissei-America, Inc., Gahanna, Ohio). ASTM D638-90 Type I tensile bars are injection molded at the following conditions: 165° C. set temperature for heating zones 1-3, 165° C. set temperature for the injection nozzle, 25° C. mold temperature, 25% screw speed, 53 mm shot size, 5% back pressure, 1.17 second mold fill time and 9 second recovery time, followed by 15 seconds cooling before removing the tensile bar from the mold.

Plasticizer loadings in the molded tensile bars are determined using weight loss data from thermogravimetric analysis (TGA) using a TA Q50 with TA Thermal Advantage software (TA Instruments; New Castle, Del.). Analysis is carried out by equilibrating the samples at 30° C. followed by a temperature ramp of 10° C./min to 600° C. The results of analysis, labeled "Actual Wt. % Plasticizer" are shown in Table 1.

Glass transition temperature ($T_g$) of the pelletized extrudates is determined by following ASTM D-3418, employing a TA Q200 instrument with refrigerated cooling and TA Thermal Advantage software. Homogeneous samples in a range of about 5 and 15 mg are placed in a T-zero pan and crimped with a T-zero lid. $T_g$ values are shown in Table 1.

Shore A hardness testing is carried out at the ends of the molded tensile bars, where the outer width is wider than the gauge width with a Durometer Type A (Instron, Norwood, Mass.) as specified by ASTM D2240. Except that the sample thickness of the molded tensile bars in the area of testing is 3.2 mm; readings are taken after 15 seconds. An average of ten readings is taken per sample and reported in Table 1.

Extraction of soluble materials is carried out in both hexanes and a 1% solution of soap in water. Hexane (Fisher Scientific, Waltham, Mass.) was used as received. The 1% soap water solution is made using deionized water and IVORY® soap shavings (Procter and Gamble Co., Cincinnati, Ohio). Five molded tensile bars are tested and the average value is recorded for each. Pre-extraction and post-extraction mass measurements are obtained on the molded tensile bars. The molded tensile bars are completely immersed (hanging in the container) in the extraction media at ambient temperature. After 24 hours of immersion, the samples are removed from the extraction media; the soap solution samples are rinsed with deionized water before being allowed to dry. All samples are air dried for 24 hours before post-extraction mass is measured. The weight loss of the samples is reported in Table 1.

TABLE 1

| Example | Actual Wt. % Plasticizer (TGA)/Source | $T_g$, (° C.) | Shore A Hardness | Wt. % loss, 24 hr in hexane | Wt. % loss, 24 hr in 1% soap solution |
|---|---|---|---|---|---|
| 4 | 30 | 5 | 89 | 0 | 0 |

Example 5

Levulinic acid (580.2 g, 5.0 mol), 1,3-propanediol (209.5 g, 2.75 mol), and sulfuric acid (39.5 mg, 22 µL, 50 ppm) are added to an empty 2-liter, 4-neck round bottom flask with stirring under nitrogen for 2 hours at 170° C. After 78% of the theoretical volatiles are collected, the reaction mixture is placed under reduced pressure. After 48 minutes, 97% of the theoretical volatiles are collected. The crude reaction mixture is cooled to room temperature.

The crude reaction mixture (390.95 g (1.44 mol)) and 1,2-propylene glycol (328.4 g, 4.3 mol; Brenntag) are added to 1-liter, 3-neck round bottom flask and heated to 70° C. with stirring at 10 torr vacuum for 4 hours. After 4 hours, 85% (44 mL) of the theoretical volatiles are collected, and propylene glycol (93.2 g, 1.22 mol) and sulfuric acid catalyst (18 mg, 10 µL) are added; the reaction mixture is stirred at 80° C. under 8 torr vacuum for an additional 4 hours. The remaining volatiles (100 mL) are collected and the reaction is cooled to room temperature. The crude product is neutralized with 20 g of dibasic sodium phosphate and filtered. The neutralized filtrate is purified by distillation and hexane extraction to yield 297.4 g of a compound having the structure

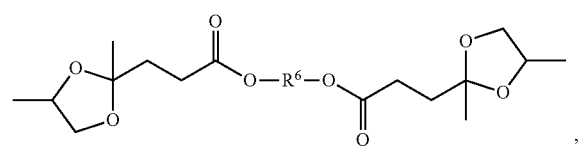

where $R^6$=—$(CH_2)_3$—;

Example 6

A 100 mL 3-neck round bottom flask is charged with 7.61 g (0.1 mol) of 1,3-propanediol ((PDO) Sigma Aldrich Company; St. Louis, Mo.) and 44.50 g (0.22 mol) of 1,2- propylene glycol ketal of ethyl levulinate. The contents of the flask are stirred at a pressure of 5 torr with heating to 90° C., and back-filled with nitrogen. 1.56 μL of titanium tetra-isoproxide is added to the flask with a nitrogen purge; the contents of the flask are then heated to 200° C. After about 2.5 hours, the reaction mixture is allowed to cool to 104° C., and a second liquid is distilled under reduced pressure at about 5 torr. Reduced pressure is maintained until no further distillate is collected. The flask is allowed to cool to ambient temperature and atmospheric pressure.

The product contains about 80.9% of a compound having the structure

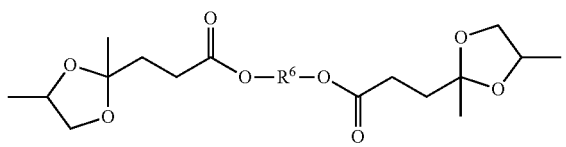

and about 3.0% of a compound having the structure:

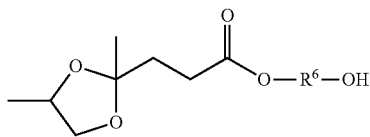

where $R^6$ in each case is —$(CH_2)$—$_3$.

Example 7

A 5-gallon Parr Model 4557 reactor (Parr Instrument Co., Moline, Ill.) was charged with 7.385 kg (36.5 moles) of 1,2-propylene glycol ketal of ethyl levulinate, 1.275 kg (12.0 moles) diethylene glycol (Alfa Aesar, >99%), 10.4 g of Irganox 1010, and 10.3 g of Irgaphos 168. The vapor condenser and reactor condenser re-circulating heater/chiller baths were set to operate at 0° C. and 85° C. respectively. The contents of the reactor were stirred at 100 rpm at a pressure of 15 torr, and the contents were heated to 108° C. The vacuum was stopped and the reactor was purged with nitrogen (2 liter per minute, LPM) while the contents were heated to 132° C. for a period of 1 hour. The water content of the reactor contents was determined to be 110 ppm. 0.336 g (1.18 mmoles) titanium (IV) isopropoxide (Sigma-Aldrich Company, St. Louis, Mo.) was mixed with 4 mL of dry 1,2-propylene glycol ketal of ethyl levulinate and added to the reactor. The reaction mixture was purged with dry nitrogen (2 LPM) while the reaction was heated to 200° C. for 4 hours, during which time condensate was collected.

Vacuum was then applied to remove unreacted 1,2-propylene glycol ketal of ethyl levulinate. The vacuum was adjusted incrementally from 300 torr to 2 torr over about 40 minutes. The applied heat was turned off during this step, and the reactor temperature fell from 197° C. to 174° C. 2.240 kg of 1,2-propylene glycol ketal of ethyl levulinate was collected. The contents of the reactor were drained to yield 5.07 kg of product mixture. GC analysis of the product mixture showed 8.0% 1,2-propylene glycol ketal of ethyl levulinate.

The product mixture was further processed in a wiped film evaporator (Pope Scientific, Saukville, Wis.) at a jacket temperature of 130° C., a pressure of 100-120 mtorr, and a cold finger temperature of 10° C. 4.688 kg of product mixture was collected.

The product mixture contained about 0.1% 1,2-propylene glycol ketal of ethyl levulinate and about 96.08% of a material according to structure I in which a is 2, b is 0, x is 1, y is 1, $R^1$ is —$CH_3$, $R^3$ is $CH(CH_3)$, $R^4$ is methylene, $R^6$ is —$(CH_2)_2$—O—$(CH_2)_2$—, and each Z is —O—.

Example 8

The foaming tendency and pour point of the product of Example 3 is evaluated according to ASTM D892 IP 146 (Foaming Characteristics—Sequences I, II and II), and ASTM D97, respectively. The foam volume (ml) is determined at the end of a 5 minute and a 10 minute blowing period. Foam volumes of 0 ml are reported in all cases. Pour point is -33° C.

Examples 9 and Comparative Sample 10

Plasticizer migration out of PVC disks into activated carbon is determined according to ASTM D1203-A4. Tests are performed on 0.5 mm and 1.0 mm thick disks; conditions are 24 hours at 70° C. Butyl benzyl phthalate is the plasticizer for Comparative Sample 2. The product of Example 3 is used as the plasticizer in Example 10. Loss of mass on this test indicates migration out of the sample; therefore, smaller absolute values indicate better results. Results are as reported in Table 2.

TABLE 2

| Plasticizer | Mass Change Activated Carbon, wt-%, 0.5 mm thick disk | Mass Change Activated Carbon, wt-%, 1.0 mm thick disk |
|---|---|---|
| Comparative Sample 10 | -2.64 | -1.81 |
| Example 9 | -1.41 | -0.99 |

Example 11

To a 2 liter 4-necked round bottom flask equipped with a dean-stark trap was added 250 g 2-methyl-1,3-propanediol (MPDO), 599.91 g Ethyl Levulinate (~1.5 eq.), and 0.5 mL of Camphorsulfonic Acid solution (40% in water). The flask was heated to 100 C and placed under vacuum, starting at 85 torr and gradually lowering to 20 torr over the course of the reaction in order to maintain a steady reflux. The lower aqueous phase in the dean-stark trap was periodically drained. After 4 hours water collection had ceased, and the reaction was quenched by addition of 10.00 g Na2HPO4 and stirring for 18 hours while the reaction cooled. After filtration to remove the quenching agent, the reaction product was purified by fractional distillation to obtain 219.58 g of MPDO ketal of ethyl levulinate (product) (37.7% of theoretical), 99.44 purity (area % by GC-FID) and containing MPDO (0.49 area % by GC-FID).

To a 500 mL 3-necked round bottom flask equipped with a dean stark trap was added 30.09 g 2-methyl-1,3-propanediol and 215.65 g of the MPDO ketal of ethyl levulinate (~3 mole equivalents). The flask was heated to 110 C and a nitrogen sweep (0.4 scfh) was introduced into the flask to remove any residual water from the reagents. After 45 minutes the temperature was increased to 165 C and 0.05 mL of titanium tetra-isopropoxide transesterification catalyst was added, and the temperature further increased to 210

C. Distillate was periodically removed from the dean-stark trap over the course of the reaction. After 4 hours the flask was allowed to cool and stabilizers (0.28 g irganox 1010 and 0.28 g irgafos 168) were added. The product was purified by removal of low molecular weight impurities using a wiped film evaporator to obtain 139.36 g product having structure (Ic) (also referred to as "PZ3") (96.9% of theoretical) having purity of 96.46% (area % by GC-FID).

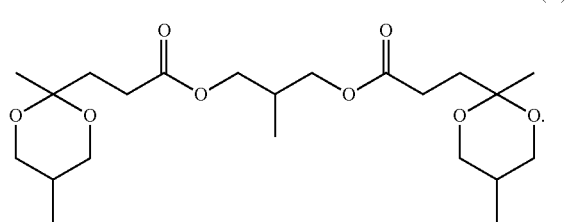

(Ic)

Example 12

62.5 wt % of PVC-2095, 1.9 wt % of ThermChek-SP1363, 3.1 wt % epoxidized soybean oil (ESO), 3.1 wt % ethyl laurate, 1.9 wt % texanol-isobutyrate, and 27.5 wt % plasticizer from Example 3 are formulated by blending with a KitchenAid mixer on low speed for 2 min while slowly adding the plasticizer. Once a paste is formed, the composition is stirred an additional 5 min. The composition is de-aerated in a vacuum oven at 40° C. and 25 mm Hg and cast onto aluminum dishes. The sample was placed on a Carver Model 4122 pneumatic heated plate press at 165° C. Samples are allowed to heat without pressure for 10 minutes. The samples form a solid flexible disk.

Blend Examples

The plastisols were prepared in a kitchen aid mixer (KitchenAid K45SSWH Stand Mixer, 4.5 Qt. Classic) using a flat beater. Initially a proportion of the plasticizer composition of up to 60 phr was weighed out into the stainless steel bowl and stirred at the lowest speed (speed setting 1). The thermal stabilizer (2 phr Ferro SP175) was then added. Then the PVC powder (100 parts) was weighed out and added slowly in small portions into the mixture under stirring at low speed. It was further stirred for 5 min after all the powder was added. Then the rest of the plasticizer was added, if levels greater than 60 phr levels were used.

Directly after preparation, the plastisol was degassed under vacuum at ambient temperature. Up to 400 ml of the plasticizer was placed in a 1 liter bottle (or 1 US quart) with a loose cap. The bottle was placed into a vacuum chamber with a window to see the contents. The vacuum was carefully switched on and adjusted with the air in-flow, to reach a maximum height of the foam to leave a top space in the bottle of at least 2 cm. Degassing was continued until the foam broke and the volume under vacuum was back to its original volume. All samples required at least 4 hours to degas, so the protocol was standardized so that all samples were left overnight to degas under vacuum.

Example 13

Extraction of Plasticizer with n-Hexane from Blends of PZ1 with DINCH

The plasticizer extraction with n-hexane was done according to ASTM D 1239-98. The films used for the extraction were prepared using a drawdown bar of 10 mil thickness. Films were cured for 20 min at 140° C. Then a sample of 1 g was weighed out on an analytical balance with a precision of 0.1 mg (Weight A). It was placed into a glass bottle filled with 100 g of n-hexane, fully immersed into the n-hexane. The bottle was capped with a solvent tight cap and left for 24 hours at ambient temperature. Then the PVC film was removed from the bottle and the excess amount of n-hexane was wiped from the surface with a paper towel. The sample was weighed (weight B). It was left overnight in the desiccator and then further dried in an oven for 30 min at 105° C. Then it was weighed again. All mass loss is assumed to be due to the plasticizer. The amount of plasticizer lost, expressed as a percentage of the introduced plasticizer was calculated as follows:

Plasticizer extraction %=((Weight $A$–Weight $C$)/Weight $A$*100*($phr$ plasticizer+$phr$ additives+100)/$phr$ plasticizer)*100

The results are shown in Table 3.

Small degrees of substitution did not impact hexane extraction in the blended plasticizer system but at substitution levels of 30% and greater, there was a large improvement of plasticizer extraction as shown in FIG. 1 and Table 3. For applications where organic materials come into contact with PVC, this plasticizer blend is advantageous as it can prolong the lifetime and delay the embrittlement of the PVC due to extraction of the plasticizer.

TABLE 3

| Example | % DINCH in plasticizer blend | % PZ1 in plasticizer blend | PVC resin | % plasticizer extracted |
|---|---|---|---|---|
| 13-1 | 100 | 0 | GEON 121A | 96.3 |
| 13-2 | 66 | 33 | GEON 121A | 91.8 |
| 13-3 | 50 | 50 | GEON 121A | 76.6 |
| 13-4 | 33 | 66 | GEON 121A | 53 |
| 13-5 | 0 | 100 | GEON 121A | 15.2 |
| 13-6 | 100 | 0 | P70 | 96.2 |
| 13-7 | 50 | 50 | P70 | 70.9 |
| 13-8 | 100 | 0 | E68CF | 100 |
| 13-9 | 50 | 50 | E68CF | 75.7 |

*All formulations contained a total of 60 phr of plasticizer composition and 2 phr of Ferro SP 175.

Example 14

Extraction of Plasticizer with Water from Blends of PZ1 with DINCH

The plasticizer extraction from films prepared from plastisols was done according to ASTM D 1239-98. Films were prepared by drawing down plastisols on an aluminum foil with a 10 mils draw down bar. The films were cured for 20 min at 140° C. They were then cooled down in a desiccator to avoid water uptake in humid environment. Then a sample of 1 g was weighed out on an analytical balance with a precision of 0.1 mg (weight A). It was placed into a 250 ml glass bottle filled with 200 ml of deionized water, fully immersed into the water phase and left for 24 hours at ambient temperature. The sample was removed from the bottle and wiped with a paper towel to remove physically attached water and dried in an oven at 105° C. for 1 hour, cooled down in a desiccator and weighed again (weight C).

The plasticizer extraction by water was calculated based on the introduced amount of plasticizer according to the following formula:

Plasticizer extraction %=((Weight $A$–Weight $C$)/Weight $A$*100*($phr$ plasticizer+$phr$ additives+100)/$phr$ plasticizer)*100

Figure 2:
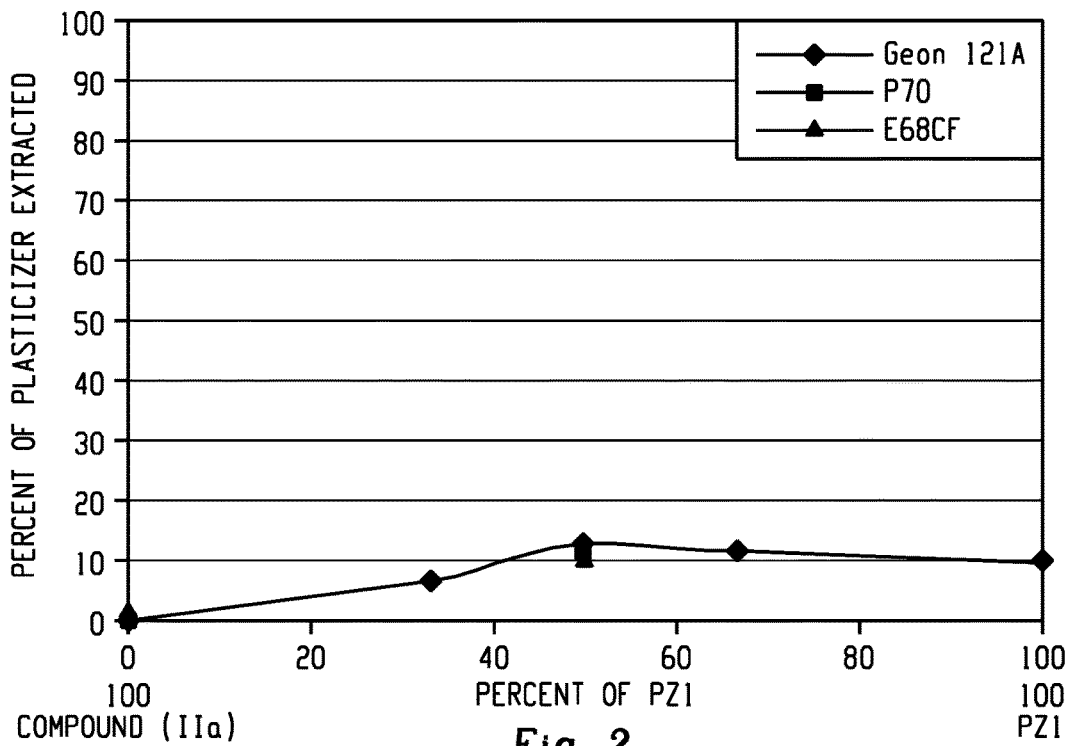
FIG. 2 shows a plot of the plasticizer extraction with water for the blends of PZ1 with Compound (IIa) as described in Example 14.

The plasticizer extraction with water is given in Table 4 and FIG. 2 for blends of Compounds PZ1 and (IIa). Table 4 lists the % of each resin extracted. Compositions having above 50% of PZ1 in the blend had water extraction at about 10%, independent of the ratio of PZ1/DINCH.

TABLE 4

% Plasticizer Lost During Water Extraction of Plastisol PVC films made with blends of PZ1 and DINCH

| Example | % DINCH in plasticizer blend | % PZ1 in plasticizer blend | PVC resin | % plasticizer extracted |
|---|---|---|---|---|
| 14-1 | 100 | 0 | GEON 121A | 0.41 |
| 14-2 | 66 | 33 | GEON 121A | 6.56 |
| 14-3 | 50 | 50 | GEON 121A | 12.8 |
| 14-4 | 33 | 66 | GEON 121A | 11.34 |
| 14-5 | 0 | 100 | GEON 121A | 9.72 |
| 14-6 | 100 | 0 | P70 | 1.13 |
| 14-7 | 50 | 50 | P70 | 11.34 |
| 14-8 | 100 | 0 | E68CF | 2.67 |
| 14-9 | 50 | 50 | E68CF | 10.8 |

*All formulations contained a total of 60 phr of plasticizer composition and 2 phr of Ferro SP 175.

Example 15

Extraction of Plasticizer with Mineral Oil from Blends of PZ1 with DINCH

Figure 3:
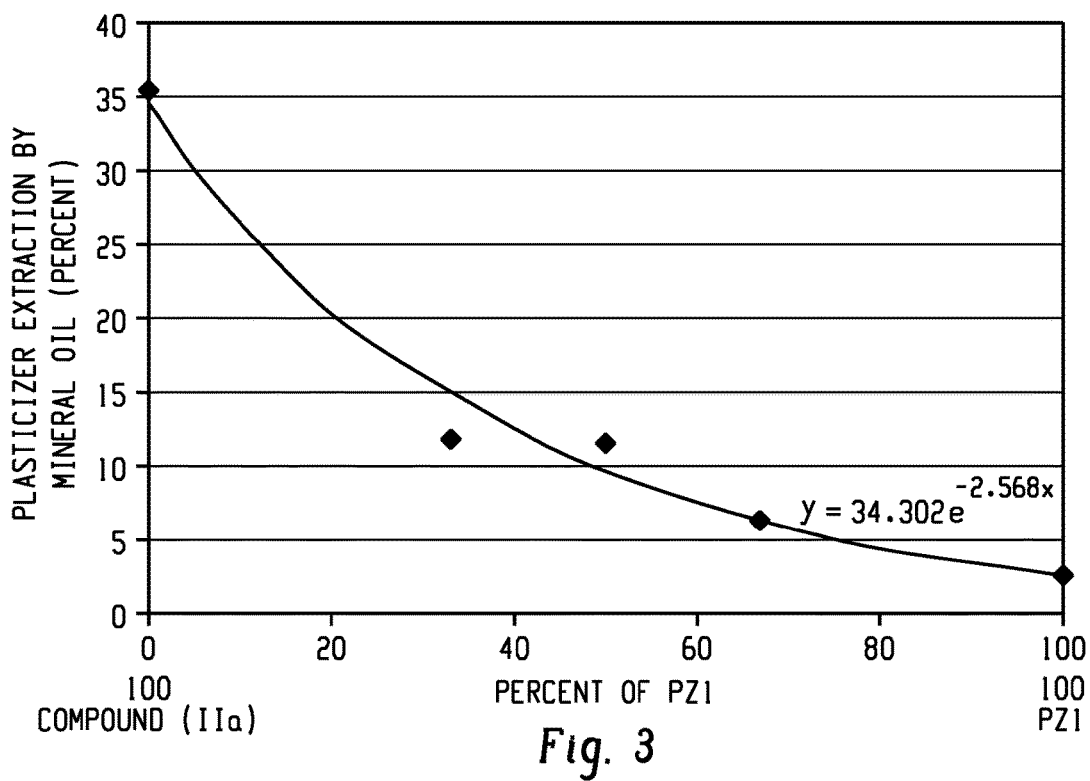
FIG. 3 shows a plot of the plasticizer extraction by mineral oil for blends of PZ1 with Compound (IIa) as described in Example 15.

The improvement of plasticizer extraction with mineral oil is initially very rapid with the approximately 30% of PZ1 blended with DINCH and then levels off when higher amounts are replaced as shown in FIG. 3. The sample with 100% DINCH had lost a lot of its flexibility and was brittle after 24 hours extraction, whereas all the blends investigated were still flexible. This is advantageous as it can prolong the lifetime and delay the embrittlement of the PVC due to extraction of the plasticizer. The performance can be adjusted to the needs, low, medium or high oil resistance for the corresponding application requirement. Thus, blending with PZ1 reduces the amount of plasticizer that extracts into oily materials.

Example 16

Gel Temperature Decrease by blending PZ1 with DINCH

The gel (fusion) temperature was measured via the gel bar method by adjusting an aluminum plate to a temperature gradient from 35° C. to 160° C. A film of 6 mil of plastisol was applied to the aluminum bar via a draw down bar. After a heating time of 1 min, the plastisol coating was covered by aluminum foil with the glossy side towards the coating. The aluminum sheet was gently smoothed onto the coating with a soft cloth. Then a roll of 500 g was rolled 3 times over the surface and the aluminum foil was removed directly after. The temperature at which the plastisol was no longer sticky and did no longer remove to the aluminum sheet, was given as gel temperature.

Figure 4:
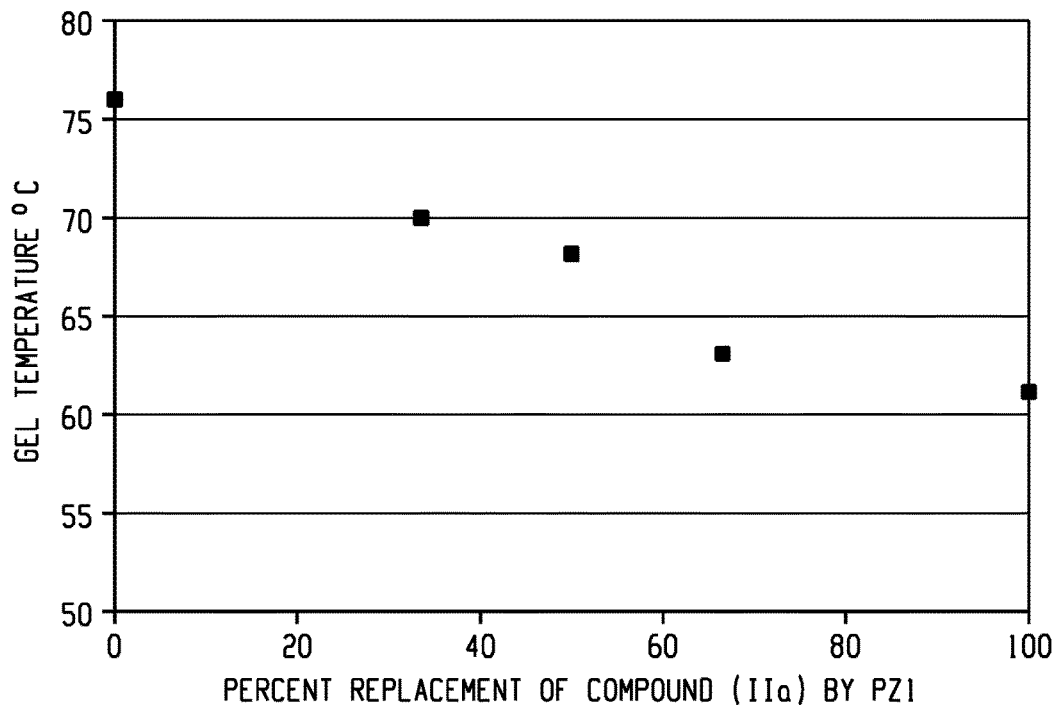
FIG. 4 shows a plot of the gel temperature change for blends of PZ1 with Compound (IIa) as described in Example 16.

FIG. 4 shows that incorporation of PZ1 can reduce the gel temperature of a system with DINCH alone. Blending as little as 30% of PZ1 with DINCH can significantly reduce the gel temperature to levels which have historically been the industry standard as a general purpose PVC plasticizer.

Examples 17-43

Materials—HEXAMOLL DINCH (1,2-Cyclohexane dicarboxylic acid, di-isononyl ester—"DINCH") was obtained from BASF Corporation. Dioctyl phthalate ("DOTP") was obtained from Aldrich. BBP (butyl benzyl phthalate—"BBP") was obtained from Ferro, under the trade name Santicizer 160. Dipropylene glycol dibenzoate ("DPGDB") was obtained from Sigma Aldrich. Diisononyl phthalate ("DINP") was obtained from Exxon Mobil under the trade name Jayflex. GEON 121A PVC resin is a high molecular weight micro-suspension grade (K=74) from PolyOne. Therm-Check 175 was obtained from Ferro Corporation, Cleveland, Ohio.

Liquid blends of plasticizers were prepared at the designated ratios (75:25 or 50:50) in advance and then slowly added to pre-weighed PVC resin with continuous mixing. Once the resin and plasticizer were well mixed, the liquid stabilizer was added. All formulations contained 100 parts GEON 121A PVC resin, 60 phr plasticizer (single component or pre-blended) and 2 phr Therm-Check 175. After mixing, the formulations were degassed in a vacuum oven overnight without heat.

Gel temperatures were measured on a metal plate with a temperature gradient. Coatings (0.006 inches thick and 3 inches wide) were drawn down on the metal plate using a 6 mil drawdown bar and a piece of smooth aluminum foil was placed on top of the liquid coating. After 1 minute, the aluminum film was removed and the film was visually assessed. The gel temperature is the point at which the film transitioned from a crackled film to a smooth film. Reported values are median temperatures measured across the width of the films.

Plastisol was poured into a metal dish and cured for 35 minutes at 180° C., resulting in films with a nominal thickness of 50 mils. The weight of the empty pan, the filled pan before cure, and the filled pan after cure were measured. The mass loss was assumed to be due to volatilization of the plasticizer and is reported in terms of % of plasticizer, which is calculated based on knowing the amount of plasticizer in the formulation, the amount of formulation added to the pan, and the amount of mass loss during the cure step.

The examples below in Table 5 show that PZ1 and PZ2 reduce the gel temperature when blended with other plasticizers. The gel temperature of DINCH, for instance, decreased from 8° C. (example 31) to 69° C. (examples 16 and 19) when adding 25% of PZ1 or PZ2. The gel temperature is comparable to the competitive plasticizer, DPGDB (example 22), but PZ1 and PZ2 have the advantages of being bio-based plasticizers. Moreover, the volatility of the 50:50 blends with PZ1 and PZ2 (examples 26 and 29) show much lower volatility than the comparative DPGDB (example 32). Volatilization during cure can have undesirable effects, like poor film quality and odors during processing. The same trends are observed with DOTP and to a lesser extent with DINP. The comparative BBP is the best at reducing gel temperature of DINP (examples 25 and 35) but it has several disadvantages that make it an unattractive option: it is a phthalate, it is listed as a danger to human health on California's Proposition 65 list, and it is being banned in Europe, effective 2015.

TABLE 5

| Example | Blend ratio (plasticizer 1: plasticizer 2) | Component 1 | Component 2 | Gel T (° C.) | % volatility, % of pz |
|---|---|---|---|---|---|
| 17 | 75:25 | DINCH | PZ1 | 69 | 8.97% |
| 18 | 75:25 | DINP | PZ1 | 69 | 6.16% |
| 19 | 75:25 | DOTP | PZ1 | 65.75 | 8.29% |
| 20 | 75:25 | DINCH | PZ2 | 68.5 | 8.26% |
| 21 | 75:25 | DINP | PZ2 | 67.8 | 5.81% |
| 22 | 75:25 | DOTP | PZ2 | 64 | 8.30% |
| 23 | 75:25 | DINCH | DPGDB | 68 | 8.46% |
| 24 | 75:25 | DINP | DPGDB | 65.5 | 7.13% |
| 25 | 75:25 | DOTP | DPGDB | 64.5 | 8.05% |
| 26 | 75:25 | DINP | BBP | 65 | 6.92% |
| 27 | 50:50 | DINCH | PZ1 | 62 | 7.90% |
| 28 | 50:50 | DINP | PZ1 | 64.6 | 6.09% |
| 29 | 50:50 | DOTP | PZ1 | 64.15 | 7.97% |
| 30 | 50:50 | DINCH | PZ2 | 65.05 | 7.81% |
| 31 | 50:50 | DINP | PZ2 | 64.55 | 5.34% |
| 32 | 50:50 | DOTP | PZ2 | 63.5 | 5.90% |
| 33 | 50:50 | DINCH | DPGDB | 63.05 | 11.94% |
| 34 | 50:50 | DINP | DPGDB | 61.4 | 8.94% |
| 35 | 50:50 | DOTP | DPGDB | 60.6 | 12.06% |
| 36 | 50:50 | DINP | BBP | 60.4 | 8.75% |
| 37 | 100:0 | DINCH | — | 86 | |
| 38 | 100:0 | DINP | — | 75 | |
| 39 | 100:0 | DOTP | — | 92 | |
| 40 | 100:0 | PZ1 | — | 61 | |
| 41 | 100:0 | PZ2 | — | 65 | |
| 42 | 100:0 | DPGDB | — | 57 | |
| 43 | 100:0 | BBP | — | 54 | |

Example 44

Circular aluminium dishes 70 mm in diameter were filled with 30 g of plastisol and cured for 10 minutes at 160° C., resulting in PVC films approximately 0.245″ (6.25 mm) in thickness. Hardness was measured near the center of the film with a Shore A durometer. Reported values in Table 6 are an average of five measurements, each taken after 15 seconds of compression.

TABLE 6

Hardness Results of Films with 80 phr of plasticizer composition

| | 100% DOTP | 75% DOTP, 25% PZ1 | 75% DOTP, 25% DPGDB | 75% DOTP, 25% PZ2 |
|---|---|---|---|---|
| Average Hardness | 67.8 | 64.8 | 67.4 | 67.2 |
| Standard Deviation | 1.643168 | 0.83666 | 0.547723 | 0.447214 |

Examples 45-53

Materials—HEXAMOLL DINCH (1,2-Cyclohexane dicarboxylic acid, di-isononyl ester—"DINCH") was obtained from BASF Corporation. Dioctyl phthalate ("DOTP") was obtained from Aldrich. BBP (butyl benzyl phthalate—"BBP") was obtained from Ferro, under the trade name Santicizer 160. Diisononyl phthalate ("DINP") was obtained from Exxon Mobil under the trade name Jayflex. GEON 121A PVC resin is a high molecular weight micro-suspension grade (K=74) from PolyOne. Therm-Check 175 was obtained from Ferro Corporation, Cleveland, Ohio.

Liquid blends of plasticizers were prepared at the appropriate ratio (75:25) in advance or neat (100%) as shown in Table 7, and then slowly added to pre-weighed PVC resin with continuous mixing. Once resin and plasticizer were well mixed, the liquid stabilizer was added. All formulations contained 100 parts GEON 121A PVC resin, 60 phr plasticizer (single component or pre-blended), 2 phr Therm-Check 175. After mixing, formulations were degassed in a vacuum oven overnight at without heat.

Gel temperature was measured on a metal plate with a temperature gradient. Coatings (0.006 inches in width) were drawn down on the metal plate using a 6 mil drawdown bar and a piece of smooth aluminum foil was placed on top of the liquid coating. After 1 minute, the aluminum film was removed and the film was visually assessed. The gel temperature is the point at which the film transitioned from a crackled, wet film to a smooth dry film. Reported values are median temperatures measured across the width of the films.

Volatility was measured when the plastisol was poured into a metal dish and cured for 35 minutes at 180° C., resulting in films with a nominal thickness of 50 mils. The weight of the empty pan, the filled pan before cure, and the filled pan after cure were measured. The mass loss was assumed to be due to volatilization of the plasticizer and is reported in terms of % of plasticizer, which is calculated based on knowing the amount of plasticizer in the formulation, the amount of formulation added to the pan, and the amount of mass loss during the cure step.

Examples below in Table 7 show that PZ3 reduces the gel temperature when blended with other plasticizers. The gel temperature of DINCH, for instance, decreased from 112° C. (example 53) to 71.9° C. (example 50). The gel temperature is comparable to the competitive plasticizer, DOTP (example 52), but PZ3 has the advantage of being a bio-based plasticizer. Moreover, the volatility of the 75:25 blends with DINCH and PZ3 (example 50) show lower volatility than the comparative DINCH (example 53). Volatilization during cure can have undesirable effects, like poor film quality, odors during processing. The same trends are observed with DOTP and to a lesser extent with DINP. The comparative BBP also works for reducing gel temperature of DINP (example 51) but it has several disadvantages that make it an unattractive option: it is a phthalate, it is listed as a danger to human health on California's Proposition 65 list, and it is being banned in Europe, effective 2015.

TABLE 7

| Example | PHR | Blend ratio (plasticizer 1:plasticizer 2) | Component 1 | Component 2 | Shore A Hardness | Gel T (° C.) | % volatility, % of pz |
|---|---|---|---|---|---|---|---|
| 45 | 70 | 100:0 | PZ3 | — | 68.2 | 68.1 | 3.92% |
| 46 | 70 | 100:0 | DINP | — | 71.0 | 101.4 | 4.42% |
| 47 | 70 | 100:0 | DOTP | — | 69.0 | 109.0 | 6.99% |
| 48 | 70 | 100:0 | DINCH | — | 68.1 | 120.4 | 8.13% |
| 49 | 60 | 75:25 | DOTP | PZ3 | 72.2 | 70.8 | 6.92% |
| 50 | 60 | 75:25 | DINCH | PZ3 | 74.0 | 71.9 | 7.08% |
| 51 | 60 | 75:25 | DINP | BBP | 74.2 | 68.4 | 7.68% |
| 52 | 60 | 100:0 | DOTP | — | 76.4 | 73.5 | 6.94% |
| 53 | 60 | 100:0 | DINCH | — | 75.1 | 112.4 | 8.66% |

Examples 54-55

Extraction of Plasticizer with Water from Blends of Compounds

The plasticizer extraction from films prepared from plastisols was done according to ASTM D 1239-98. Films were prepared by drawing down plastisols having 70 PHR of plasticizer and 2 PHR of Therm-Check 175 on an aluminum foil with a 10 mils draw down bar. The films were cured for 20 min at 140° C. They were then cooled down in a desiccator to avoid water uptake in humid environment. Then a sample of 1 g was weighed out on an analytical balance with a precision of 0.1 mg. It was placed into a 250 ml glass bottle filled with 200 ml of deionized water, fully immersed into the water phase and left for 24 hours at ambient temperature. The sample was removed from the bottle and wiped with a paper towel to remove physically attached water and dried in an oven at 105° C. for 1 hour, cooled down in a desiccator and weighed again (weight C).

The plasticizer extraction by water was calculated by % weight loss and is shown below in Table 8.

TABLE 8

| Example | PHR | Component | % weight loss, DI extraction |
|---|---|---|---|
| 54 | 70 | PZ3 | 1.43% |
| 55 | 70 | DINP | 0.23% |

This shows a surprisingly low comparative water extraction property for PZ3, which makes it a desirable blend component for systems where good (low) water extraction properties are desirable.

Examples 56-61

Liquid blends of plasticizers were prepared at the appropriate ratio (75:25) in advance or neat (100%) and then slowly added to pre-weighed PVC resin with continuous mixing. Once resin and plasticizer were well mixed, the liquid stabilizer was added. All formulations contained 100 parts GEON 121A PVC resin, 60 phr plasticizer (single component or pre-blended), 1 or 2 phr Mark 1221, and in some formulations 3 phr of Epoxidized Soybean Oil. After mixing, formulations were degassed in a vacuum oven overnight without heat.

Gel temperature was measured on metal plate with a temperature gradient. Coatings (0.006) inches in width) were drawn down on the metal plate using a 6 mil drawdown bar and a piece of smooth aluminum foil was placed on top of the liquid coating. After 1 minute, the aluminum film was removed and the film was visually assessed. The gel temperature is the point at which the film transitioned from a crackled, wet film to a smooth dry film. Reported values are median temperatures measured across the width of the films.

Volatility was measured when the plastisol was poured into a metal dish and cured for 35 minutes at 180° C., resulting in films with a nominal thickness of 50 mils. The weight of the empty pan, the filled pan before cure, and the filled pan after cure were measured. The mass loss was assumed to be due to volatilization of the plasticizer and is reported in terms of % of plasticizer, which is calculated based on knowing the amount of plasticizer in the formulation, the amount of formulation added to the pan, and the amount of mass loss during the cure step.

Dioctyl phthalate (DOTP) was obtained from Aldrich.

Examples below in Table 9 show that ESO reduces the volatility in the PZ2 (example 58) formulation. Volatilization during cure can have undesirable effects, like poor film quality, odors during processing. The same trends are observed with DOTP and to a lesser extent with DINP. While comparative BBP may also be good at reducing gel temperature of DINP, it has several disadvantages that make it an unattractive option: it is a phthalate, it is listed as a danger to human health on California's Proposition 65 list, and it is being banned in Europe, effective 2015.

TABLE 9

| Example | PHR | Blend ratio (plasticizer 1:plasticizer 2) | Component 1 | Component 2 | Stabilizer phr | ESO phr | Gel T (° C.) | % volatility, % of pz |
|---|---|---|---|---|---|---|---|---|
| 56 | 60 | 100:0 | PZ1 | — | 2 | — | 66.2 | 10.43% |
| 57 | 60 | 100:0 | PZ1 | — | 1 | — | 66.4 | 9.15% |
| 58 | 60 | 100:0 | PZ1 | — | 1 | 3 | 65.9 | 7.31% |
| 59 | 60 | 75:25 | DOTP | PZ1 | 2 | — | 69.2 | 6.23% |
| 60 | 60 | 75:25 | DOTP | PZ1 | 1 | — | 68.9 | 6.77% |
| 61 | 60 | 75:25 | DOTP | PZ1 | 1 | 3 | 68.3 | 7.02% |

Example 62

Colorimeter Heat Stabilizer Color Shift 6 grams of product for each of the formulations from Examples 56-61 was weighed into 50 mm aluminum pans; one for each time 10, 40, 90, and 120 minutes and were cured at 160° C. The resulting discs were then read on the colorimeter for CIELAB b and Yi values. The results are shown in FIGS. 5 and 6.

Figure 5:
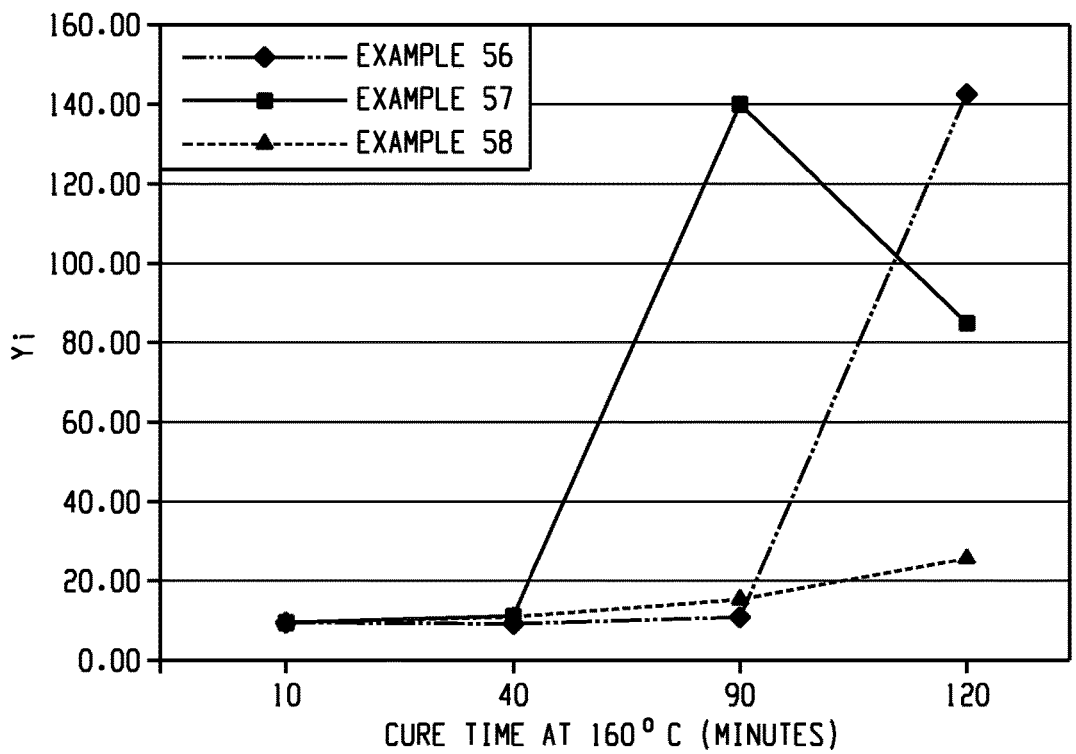
FIG. 5 shows a plot of the color change over time for various PZ1 formulations as described in Example 62.

FIG. 5 shows that the example 57 formulation effects the color shift at 90 minutes versus the example 56 formulation that turns dark after 120 minutes. Also example 58 shows that the addition of 3 phr of ESO stabilizes the color.

Figure 6:
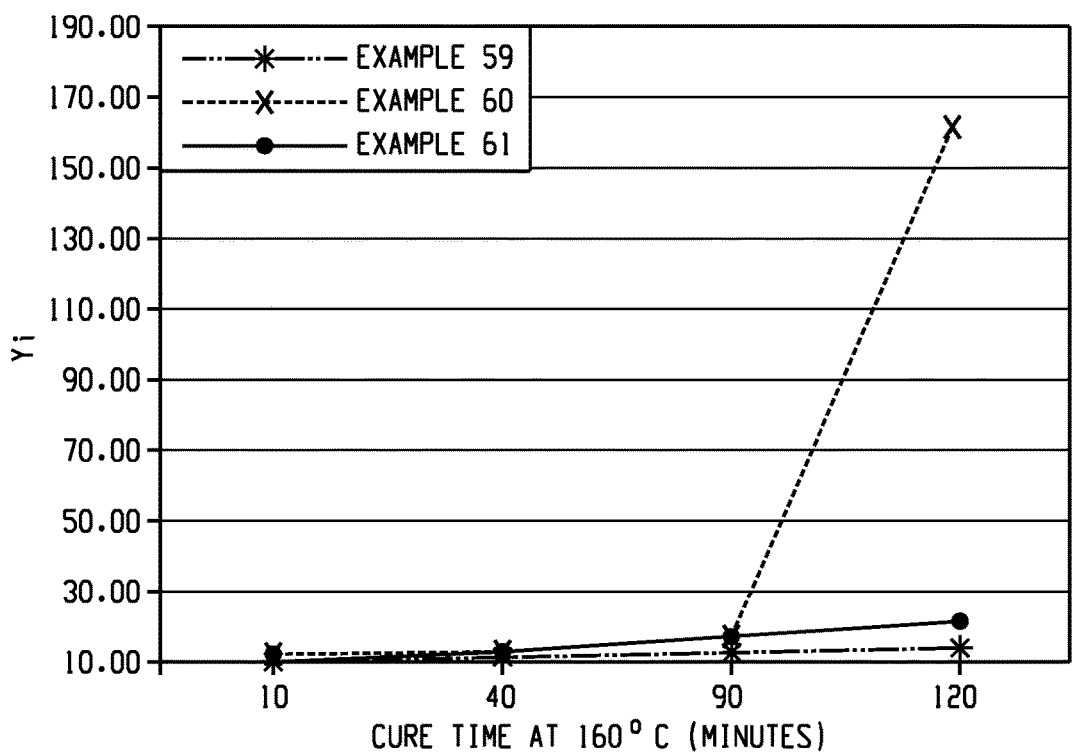
FIG. 6 shows a plot of the color change over time for various formulations including blends of PZ1 with DOTP as described in Example 62.

FIG. 6 shows that example 60 has a color shift at 120 minutes where the other formulations (example 59 and 61) do not shift at those cure times. It shows that the addition of ESO stabilizes color even when the stabilizer is reduced by 50%.

The present disclosure may suitably comprise, consist of, or consist essentially of, any of the disclosed or recited elements. The disclosure illustratively disclosed herein can be suitably practiced in the absence of any element which is not specifically disclosed herein. The various embodiments described above are provided by way of illustration only and should not be construed to limit the claims attached hereto. It will be recognized that various modifications and changes may be made without following the example embodiments and applications illustrated and described herein, and without departing from the true spirit and scope of the following claims.

What is claimed is:

1. A formulation comprising:
   a polymer; and
   a plasticizer composition wherein the plasticizer composition comprises a blend of
   i) a first compound having a structure corresponding to Structure (Ib)

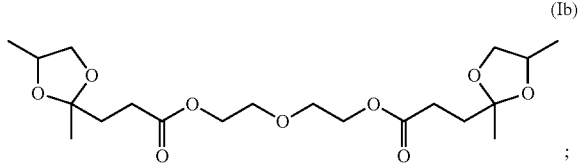

(Ib)

and
   ii) a second compound selected from an ortho phthalate compound, a terephthalate compound, a benzoate ester compound, or a bio-based compound; wherein the plasticizer composition is at least 10% by weight of the total of the polymer and the plasticizer composition.

2. The formulation of claim 1, wherein the second compound is an ortho phthalate compound.

3. The formulation of claim 2, wherein the ortho phthalate compound has the structure (V):

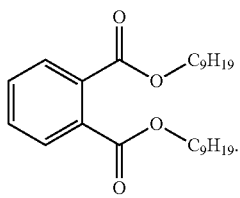

4. The formulation of claim 2, wherein the ortho phthalate compound has the structure (III):

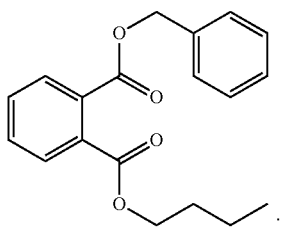

5. The formulation of claim 1, wherein the second compound is a terephthalate compound.

6. The formulation of claim 5, wherein the terephthalate compound has the structure (VI):

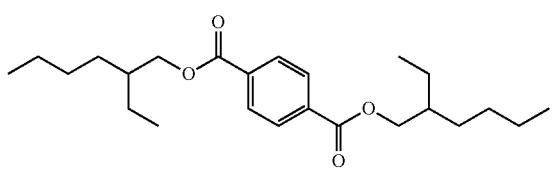

7. The formulation of claim 1, wherein the second compound is a benzoate ester compound having the structure (IV):

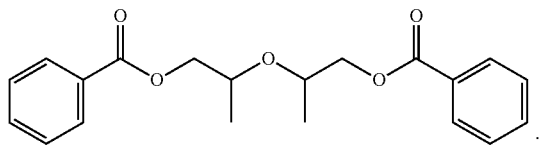

8. The formulation of claim 1, wherein the polymer is selected from a poly(vinyl chloride), polyhydroxyalkanoate, a poly(lactic acid), a polystyrene, a polyurethane, a polyurea, a polyurea-urethane, a polycarbonate, an acrylic polymer, a styrene-acrylic polymer, a vinyl-acrylic polymer, an ethylene-vinyl acetate polymer, a polyester, a polyamide, a polyether, a polybutadiene, an acrylonitrile-butadiene-styrene copolymer, a styrene-butadiene-styrene copolymer, a polyvinyl acetate, an elastomer, or homopolymers thereof, or random, graft, or block copolymers thereof, or blends or mixtures thereof.

9. The formulation of claim 1, wherein the polymer comprises a poly(vinyl chloride).

10. The formulation of claim 1, wherein the formulation is a plastisol.

11. The formulation of claim 1, wherein the formulation is a dry blend.

12. The formulation of claim 1, further comprising one or more additives selected from crosslinkers, adjuvants, colorants, antifouling agents, tougheners, solvents, fillers, metal particulates, odor scavenging agents, lubricants, thermal stabilizers, light stabilizers including UV stabilizers, flame retardant additives, pigments, blowing agents, processing aids, impact modifiers, coalescing solvents, antioxidants or a combination of any two or more thereof.

13. An article comprising the formulation of claim 1.

14. A process for plasticizing a polymer, the process comprising mixing a polymer and a plasticizing amount of the plasticizer composition of claim 1.

15. A plastisol formulation comprising:
an organic polymer; and
a plasticizer composition, wherein the plasticizer composition comprises a blend of
i)
a compound having the Structure (Ib):

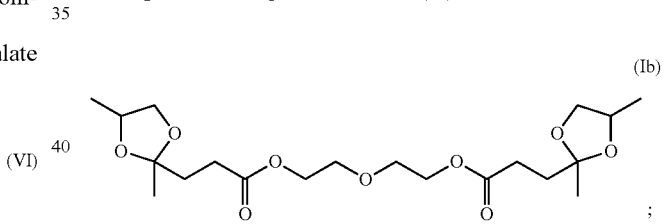

and
ii) a second compound selected from
a compound having any of the structures (III-VI):

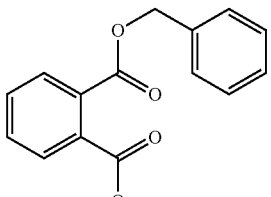

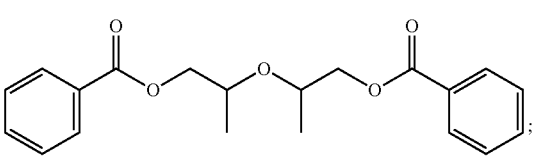

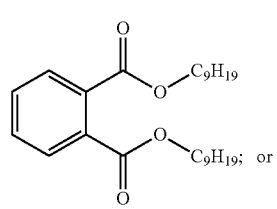
(V)
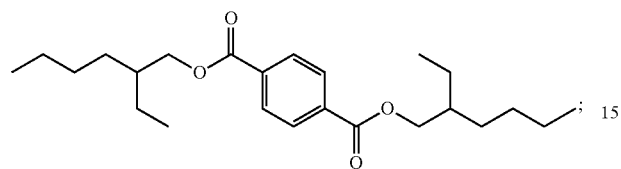
(VI)
wherein the plasticizer composition comprises from 1 to 90% of the combined weights of the plasticizer composition and the polymer.
16. The plastisol formulation of claim 15, wherein the second compound is
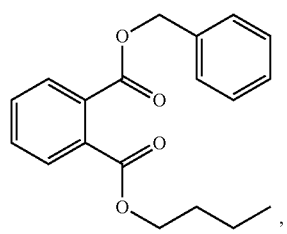
(III)
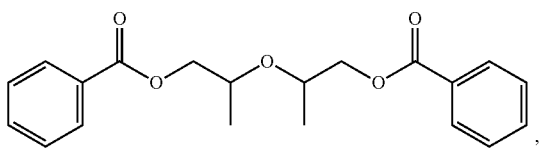
(IV)
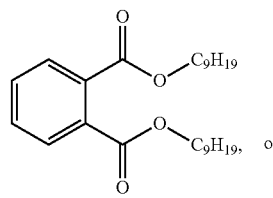
(V)
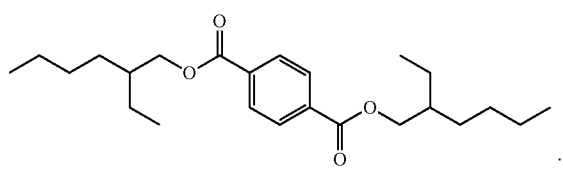
(VI)
* * * * *